US010346767B2

(12) United States Patent
Hammann

(10) Patent No.: US 10,346,767 B2
(45) Date of Patent: *Jul. 9, 2019

(54) SYSTEM AND METHOD EMPLOYING CAPACITY/DEMAND MANAGEMENT IN PREPARED FOOD SERVICE INDUSTRY

(75) Inventor: Jerald A. Hammann, Minneapolis, MN (US)

(73) Assignee: GoalAssist Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/999,378

(22) Filed: Oct. 31, 2001

(65) Prior Publication Data

US 2003/0083919 A1    May 1, 2003

(51) Int. Cl.
*G06Q 10/06* (2012.01)
*G06Q 30/02* (2012.01)
*G06Q 30/08* (2012.01)

(52) U.S. Cl.
CPC ....... *G06Q 10/06* (2013.01); *G06Q 10/06315* (2013.01); *G06Q 30/02* (2013.01); *G06Q 30/08* (2013.01)

(58) Field of Classification Search
CPC .............................. G06Q 10/00; G06Q 30/02
USPC ......................... 705/1, 10, 15, 7–9
See application file for complete search history.

(56) References Cited

U.S. PATENT DOCUMENTS

| 4,937,743 | A | * | 6/1990 | Rassman et al. ............... 705/8 |
| 5,255,181 | A | * | 10/1993 | Chapman et al. ............... 705/8 |
| 5,255,184 | A | | 10/1993 | Hornick et al. |
| 5,270,921 | A | | 12/1993 | Hornick |
| 5,291,394 | A | * | 3/1994 | Chapman ............................. 705/8 |
| 5,299,115 | A | * | 3/1994 | Fields et al. .................... 705/10 |
| 5,369,570 | A | * | 11/1994 | Parad ............................... 705/8 |
| 5,404,291 | A | | 4/1995 | Kerr et al. |
| 5,418,713 | A | * | 5/1995 | Allen .............................. 705/32 |
| 5,630,070 | A | * | 5/1997 | Dietrich et al. .................. 705/8 |
| 5,640,569 | A | * | 6/1997 | Miller et al. ................... 710/241 |
| 5,712,985 | A | * | 1/1998 | Lee et al. ........................ 705/7 |
| 5,918,209 | A | * | 6/1999 | Campbell ............. G06Q 10/02 705/5 |
| 5,991,739 | A | | 11/1999 | Cupps et al. |
| 6,049,774 | A | | 4/2000 | Roy |
| 6,061,691 | A | | 5/2000 | Fox |
| 6,078,866 | A | | 6/2000 | Buck et al. |

(Continued)

OTHER PUBLICATIONS

"AI @ Work", Knowledge Technology, May/Jun. 1998 [retrieved Jul. 8, 2003], vol. 12, No. 3, 1 page, retrieved from: Dialog, file 2.*

(Continued)

*Primary Examiner* — Robert D Rines

(74) *Attorney, Agent, or Firm* — Dicke, Billig & Czaja, PLLC

(57) ABSTRACT

A computer-based method and system for capacity/demand management in restaurant and other prepared-food service industries accepts transaction parameter values for composite resources. At least a portion of the transaction parameter values for at least one composite resource are communicated to at least one potential user of the composite resource. The transaction parameter values for composite resources can be determined using at least one yield-management method and/or by at least one resource network manager.

30 Claims, 16 Drawing Sheets

(56) References Cited

U.S. PATENT DOCUMENTS

| | | | |
|---|---|---|---|
| 6,188,989 B1* | 2/2001 | Kennedy | 705/8 |
| 6,253,187 B1 | 6/2001 | Fox | |
| 6,263,315 B1* | 7/2001 | Talluri | 705/8 |
| 6,269,361 B1 | 7/2001 | Davis et al. | |
| 6,298,331 B1* | 10/2001 | Walker et al. | 705/15 |
| 6,526,392 B1* | 2/2003 | Dietrich et al. | 705/400 |
| 6,584,447 B1* | 6/2003 | Fox et al. | 705/10 |
| 6,609,101 B1* | 8/2003 | Landvater | 705/10 |
| 6,741,969 B1* | 5/2004 | Chen et al. | 705/14 |
| 6,922,672 B1* | 7/2005 | Hailpern et al. | 705/14 |
| 6,993,494 B1* | 1/2006 | Boushy et al. | 705/10 |
| 7,188,073 B1* | 3/2007 | Tam et al. | 705/7.16 |
| 2001/0039514 A1* | 11/2001 | Barenbaum et al. | 705/14 |
| 2001/0051932 A1 | 12/2001 | Srinivasan et al. | |
| 2002/0013734 A1 | 1/2002 | Bueno | |
| 2002/0042738 A1 | 4/2002 | Srinivasan et al. | |
| 2002/0107720 A1* | 8/2002 | Martin | 705/10 |
| 2002/0169657 A1* | 11/2002 | Singh et al. | 705/10 |
| 2002/0198756 A1* | 12/2002 | Ghaisas et al. | 705/8 |
| 2003/0046120 A1* | 3/2003 | Hoffman et al. | 705/7 |
| 2003/0233278 A1* | 12/2003 | Marshall | 705/14 |

OTHER PUBLICATIONS

"Predicting Consumer Response", Ward Systems Group, Inc., May/Jun. 1998 [retrieved Mar. 20, 2003], 2 pages, retrieved from: Google.com.*

Screenshots of Ward Systems Group, Inc., www.wardsystems.com, Jan. 25, 1999 [retrieved Jan. 26, 2004], 13 pages, retrieved from: google.com and archive.org.*

Desiraju, Ramarao et al., "Strategic Service Pricing and Yield Management," *Journal of Marketing*, pp. 44-56, (Jan. 1999).

Kimes, Sheryl E., "Yield Management: A Tool for Capacity-Constrained Service Firms," *Journal of Operations Management*, vol. 8, No. 4, pp. 348-363, (Oct. 1989).

Ticketmaster, "Evite.com," Creat-Event Details, 1 page, (2002). <http://www.evite.com>.

Go2 Systems, Inc., "Connecting You to Nearby Businesses, Services and Entertainment," 3 pages, (2002). <http://www.go2.com>.

Knowledge Technology, "AI @ Work," PC AI, vol. 12, No. 3, pp. 39-40 (May-Jun. 1998). (INSPEC Abstract No. C9809-7170-001).

Ward Systems Group, Inc., Predicting Consumer Response, www.wardsystems.com, pp. 2, (May-Jun. 1998).

PCT International Search Report for International Application No. PCT/US02/35229 dated Apr. 11, 2003 (5 pages).

* cited by examiner

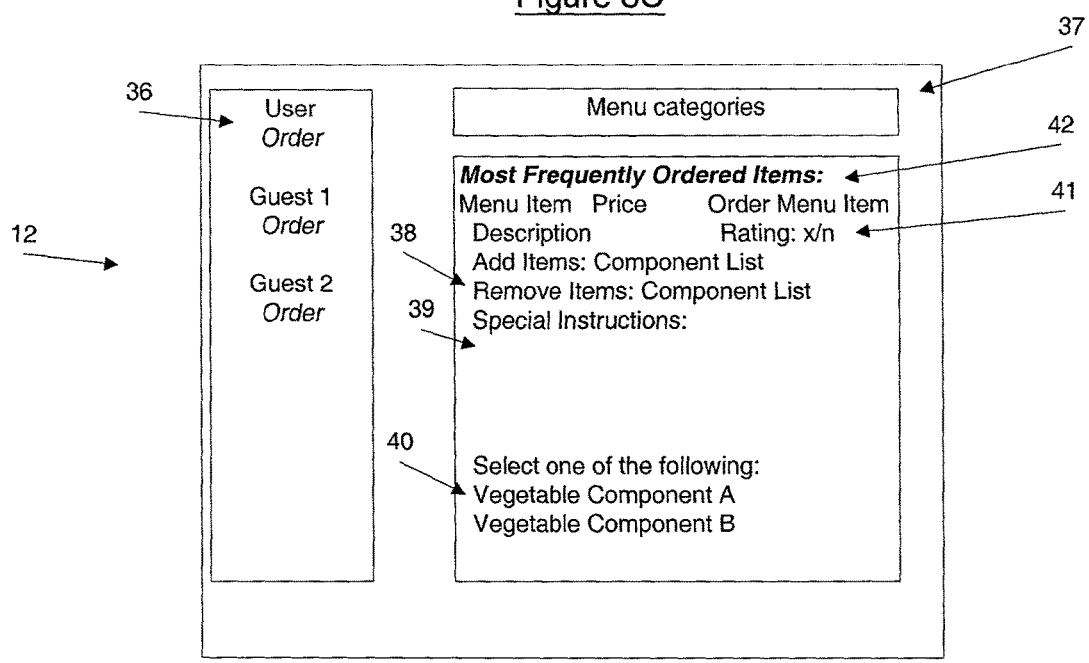

Figure 4C

| | Time | 11:00 AM | 11:15 AM | 11:30 AM | 11:45 AM | 12:00 PM | 12:15 PM | 12:30 PM | 12:45 PM | 1:00 PM | 1:15 PM | 1:30 PM | 1:45 PM | Total | Annualized |
|---|---|---|---|---|---|---|---|---|---|---|---|---|---|---|---|
| 58 | Base Arrival Demand | 4 | 5 | 8 | 10 | 10 | 6 | 9 | 7 | 4 | 3 | 2 | 2 | | |
| | 15% off Order Discount | 2 | 3 | | | | | 3 | 4 | 2 | 1 | 3 | 2 | | |
| | Online Orders | | | 6 | 8 | 9 | 4 | - | - | - | - | - | - | | |
| | Adjusted Arrival Demand | 6 | 8 | 14 | 18 | 19 | 12 | 12 | 11 | 6 | 4 | 5 | 4 | | |
| | Base Order Demand | 4.0 | 9.0 | 17.0 | 23.0 | 28.0 | 28.0 | 27.0 | 24.0 | 20.0 | 14.0 | 9.0 | 7.0 | | |
| | Adjusted Order Demand | 6.0 | 14.0 | 28.0 | 40.0 | 51.0 | 49.0 | 43.0 | 35.0 | 29.0 | 21.0 | 15.0 | 13.0 | | |
| | Adjusted Minute Demand | 21.0 | 40.0 | 68.0 | 95.0 | 105.0 | 94.0 | 86.0 | 78.5 | 67.0 | 48.0 | 37.5 | 32.0 | | |
| 60 | Adjusted Order Staff | 3.0 | 3.0 | 5.0 | 7.0 | 8.0 | 8.0 | 8.0 | 8.0 | 5.0 | 5.0 | 5.0 | 5.0 | | |
| | Staff Capacity | 18.0 | 18.0 | 30.0 | 42.0 | 48.0 | 48.0 | 48.0 | 48.0 | 30.0 | 30.0 | 30.0 | 30.0 | | |
| | Adjusted Staff Capacity | 18.0 | 18.0 | 32.1 | 45.1 | 51.9 | 50.5 | 48.0 | 48.0 | 30.0 | 30.0 | 30.0 | 30.0 | | |
| | Required Staff | 1.4 | 2.7 | 4.5 | 6.3 | 7.0 | 6.3 | 5.7 | 5.2 | 4.5 | 3.2 | 2.5 | 2.1 | | |
| | Capacity - Demand | 12 | 4 | 4 | 5 | 1 | 2 | 5 | 13 | 1 | 9 | 15 | 17 | | |
| 59 | Normal Order Effort | 3.5 | 2.0 | 2.0 | 7.5 minutes | (translates to 6 tables per staff) | | | | | | | | | |
| | Online Order Effort | 2.0 | 2.0 | | 4.0 minutes | | | | | | | | | | |
| 61 | Financial Impact | | | | | | | | | | | | | | |
| | Incremental Order Sales | 2 | 3 | 6 | 8 | 9 | 4 | 3 | 4 | 2 | 1 | 3 | 2 | 47 | 17,155 |
| | Incremental Dollar Sales | 28.00 | 42.00 | 84.00 | 112.00 | 126.00 | 56.00 | 42.00 | 56.00 | 28.00 | 14.00 | 42.00 | 28.00 | 658 | 240,170 |
| | Discount | (4.20) | (6.30) | - | - | - | - | (6.30) | (8.40) | (4.20) | (2.10) | (6.30) | (4.20) | (42) | (15,330) |
| | Variable (Food) Cost | (8.40) | (12.60) | (25.20) | (33.60) | (37.80) | (16.80) | (12.60) | (16.80) | (8.40) | (4.20) | (12.60) | (8.40) | (197) | (72,051) |
| | CT Service Costs | (2.80) | (4.20) | (8.40) | (11.20) | (12.60) | (5.60) | (4.20) | (5.60) | (2.80) | (1.40) | (4.20) | (2.80) | (66) | (24,017) |
| | Incremental Profit | 12.60 | 18.90 | 50.40 | 67.20 | 75.60 | 33.60 | 18.90 | 25.20 | 12.60 | 6.30 | 18.90 | 12.60 | 353 | 128,772 |
| | Profit Margin | 45% | 45% | 60% | 60% | 60% | 60% | 45% | 45% | 45% | 45% | 45% | 45% | 54% | 54% |

Figure 4D

Add a new promotional offer

Offer: [                              ]

Detail: [                              ]

Amount: [    ] [Dollars Off ▼]   Contact: [Website ▼]

Visible beginning: [Feb ▼] [9 ▼] [2001 ▼] [4 ▼]:[30 ▼] [PM ▼]

Available from: [Feb ▼] [9 ▼] [2001 ▼] [4 ▼]:[30 ▼] [PM ▼]

to: [Feb ▼] [9 ▼] [2001 ▼] [4 ▼]:[30 ▼] [PM ▼]  Repeat

Quantity Type: [Fixed Quantity ▼] of [    ] for [Offer Length ▼]

62 → PennyPlus Bid Price ($) [0 25]   List Priority: [1 ▼]

Restriction Type: [TimeWindow ▼] Start Time: [4 ▼]:[30 ▼] [PM ▼]

End Time: [4 ▼]:[30 ▼] [PM ▼]

Resource List

72

| 1 | 265 | 101 | Table 2 | 15 | 1 |
|---|---|---|---|---|---|
| 2 | 265 | 101 | Table 3 | 15 | 1 |
| 3 | 265 | 243 | Staff Type A | 80 | 7 |
| 4 | 265 | 313 | Oven | 70 | 4 |
| ... | ... | ... | ... | ... | ... |
| 75 { n | n | 401 | Vehicle | 2 | 6 |

76  77  78      79         80  81

Composite Resource List

73

| 117 | 265 | Carry-out Order | 313 | 00 | 08 | 211 | 15 | 45 | | | |
|---|---|---|---|---|---|---|---|---|---|---|---|
| 118 | 265 | Dine in Order ER | 101 | 00 | 120 | 243 | 00 | 3.5 | 243 | 15 | 03 |
| 119 | 265 | Dine in Order AO | 101 | 00 | 30 | 313 | 15 | 08 | 243 | 25 | 03 |
| 120 | 265 | Dine in Order AR | 101 | 00 | 14 | 101 | 15 | 15 | 101 | 30 | 15 |
| ... | ... | ... | ... | ... | ... | ... | ... | ... | ... | ... | ... |
| 82 { n | n | Catering Order | n | s | d | n | s | d | n | s | d |

83   77        84        $85^{1a}$ $85^{1b}$ $85^{1c}$ $85^{2a}$ $85^{2b}$ $85^{2c}$ $85^{na}$ $85^{nb}$ $85^{nc}$

Demand Records List

74

| 1 | 265 | 200011190700 | 200011190714 | 300 | 4 | 2 |
|---|---|---|---|---|---|---|
| 2 | 265 | 200011190715 | 200011190729 | 250 | 3 | 4 |
| 3 | 265 | 200011190730 | 200011190744 | 160 | 3 | 3 |
| 4 | 265 | 200011190745 | 200011190759 | 120 | 6 | 2 |
| ... | ... | ... | ... | ... | ... | ... |
| 86 { n | n | start time | end time | 100 | 4 | 2 |

83  77   87       88      89  90  91

SYSTEM AND METHOD EMPLOYING CAPACITY/DEMAND MANAGEMENT IN PREPARED FOOD SERVICE INDUSTRY

THE FIELD OF THE INVENTION

The present invention generally relates to employing capacity/demand management to selected types of industries, and more particularly to employing capacity/demand management in prepared food service industries.

BACKGROUND OF THE INVENTION

Restaurants and other prepared-food providers use a variety of means to create, build and manage their business. These means include: means for building customer awareness of their service; means for attracting customers to their service; means for encouraging customers to continue using their service; means for procuring and utilizing land, equipment, food materials, supplies, labor and capital to provide their service; and, means for managing and coordinating the above means.

Since the beginning of commercial transactions, restaurants and prepared-food providers have accomplished these tasks with mixed results. As technological and societal advances took place, the industry co-opted these advances. Stone and wood-cutting tools resulted in restaurant signs. The invention of writing devices brought menu boards. The printing press brought printed menus and order pads. Mass publications like magazines and newspapers brought advertising. The automobile, along with the interstate highway system resulted in billboard advertising, fast food restaurants, drive-through windows, delivery service and large restaurant chains under the same name and ownership. The advent of computers brought electronic demand planning, staff scheduling, supplier ordering and accounting and business management applications.

Each of these advances changed the demand for restaurant and other prepared-food services, the way in which consumers used these services and the manner in which these services were provided. With each new advance, the industry grew and diversified, meeting the unique needs of more and more consumers, more frequently. However, these advances also brought greater complexity to the process of providing restaurant and other prepared-food services. Further, these advances failed to address some of the problems plaguing the industry since its inception.

Despite it's service diversification, participants in the restaurant and other prepared-food services industries have not invented a system capable of flexibly managing their ability to provide service through any or all of their variety of service delivery mechanisms (e.g., dine in service, carry-out service, delivery service, catering service, consumer self-service, machine service, etc.,) with the demand for these services.

Furthermore, since they have never taken the step just above mentioned, they also have never been able to flexibly match the demand for these services and service delivery mechanisms with their ability to provide these services.

SUMMARY OF THE INVENTION

One aspect of the present invention provides a computer-based method for capacity/demand management in prepared-food service industries. The method includes accepting transaction parameter values for composite resources. The method includes communicating at least a portion of the transaction parameter values for at least one composite resource to at least one potential user of the composite resource.

The transaction parameter values for composite resources may be determined using at least one yield-management method. The transaction parameter values for composite resources may be determined by at least one resource network manager. The communication of at least a portion of the transaction parameter values for at least one composite resource to at least one potential user of the composite resource may employ a transaction invitation management method. The communication of at least a portion of the transaction parameter values for at least one composite resource to at least one potential user of the composite resource may employ a list bid price management method.

One aspect of the present invention provides a computer based system for capacity/demand management in prepared-food service industries. Computerized means accept transaction parameter values for composite resources. Computerized means communicate the transaction parameter values for at least one composite resource to at least one user. The transaction parameter values for composite resources may be determined using at least one yield-management method. The transaction parameter values for composite resources may be determined by at least one resource network manager. The communication of at least a portion of the transaction parameter values for at least one composite resource to at least one potential user of the composite resource may employ a transaction invitation management method. The communication of at least a portion of the transaction parameter values for at least one composite resource to at least one potential user of the composite resource may employ a list bid price management method.

One aspect of the present invention provides a capacity/demand management system including a storage device storing a program. The capacity/demand management system includes a processor connected to the storage device and controlled by the program. The processor operative with the program accepts transaction parameter values for composite resources in prepared-food service industries. The processor operative with the program also communicates at least a portion of the transaction parameter values for at least one composite resource to at least one user. The transaction parameter values for composite resources may be determined using at least one yield-management method. The transaction parameter values for composite resources may be determined by at least one resource network manager. The communication of at least a portion of the transaction parameter values for at least one composite resource to at least one potential user of the composite resource may employ a transaction invitation management method. The communication of at least a portion of the transaction parameter values for at least one composite resource to at least one potential user of the composite resource may employ a list bid price management method.

One aspect of the present invention provides a computer-readable medium containing program instructions for controlling a computer to perform a method including receiving data related to individual resources and associated composite resources. The associated composite resources each include a collection of at least two of the individual resources. The associated composite resources are in prepared-food service industries. The method includes accepting transaction parameter values related to individual resources and associated composite resources, wherein the associated composite resources each include a collection of at least two of the individual resources, and wherein the composite resources are in prepared-food service industries. The method includes storing the data related to the individual resources and the associated composite resources. The method includes constructing internal data structures which link each of the individual resources to their associated composite resources and link each of the composite resources to their associated individual resources. The transaction parameter values for composite resources may be determined using at least one yield-management method. The transaction parameter values for composite resources may be determined by at least one resource network manager. The communication of at least a portion of the transaction parameter values for at least one composite resource to at least one potential user of the composite resource employs a transaction invitation management method. The communication of at least a portion of the transaction parameter values for at least one composite resource to at least one potential user of the composite resource employs a list bid price management method.

One aspect of the present invention provides a computer-based method for producing composite resource transactions. The method includes accepting transaction parameter values for composite resources in prepared-food service industries. The method includes communicating at least a portion of the transaction parameter values for at least one composite resource to at least one potential user. The method includes receiving a responding communication from at least one user binding at least one composite resource with specified transaction parameter values. The transaction parameter values for composite resources may be determined using at least one yield-management method. The transaction parameter values for composite resources may be determined by at least one resource network manager. The communication of at least a portion of the transaction parameter values for at least one composite resource to at least one potential user of the composite resource employs a transaction invitation management method. The communication of at least a portion of the transaction parameter values for at least one composite resource to at least one potential user of the composite resource employs a list bid price management method.

One aspect of the present invention provides a computer-based method for transaction invitation management. The method includes accepting a list array of at least one potential concurrent user of a selected non-computer composite resource. The method includes communicating to a list array of at least one potential concurrent user of at least one selected composite resource, an invitation to participate in the use of at least one selected composite resource. The method includes accepting a responding communication from any accepting concurrent users reserving at least one composite resource. At least one selected non-computer composite resource may be employed in prepared food industries.

One aspect of the present invention provides a computer-based system for transaction invitation management. The system includes means for accepting a list array of at least one potential concurrent user of a selected non-computer composite resource. The system includes means for communicating to a list array of at least one potential concurrent user of a selected composite resource, an invitation to participate in the use of at least one selected composite resource. The system includes means for accepting a responding communication from any accepting concurrent users reserving at least one composite resource. At least one selected non-computer composite resource may be employed in prepared food industries.

One aspect of the present invention provides a capacity/demand management system. The system is comprised of a storage device storing a program. The system is comprised of a processor connected to the storage device and controlled by the program, the processor operative with the program to accept a list array of at least one potential concurrent user of at least one selected non-computer composite resource, to communicate to a list array of at least one potential concurrent user of a selected composite resource specified by the user, an invitation to participate in the use of at least one selected composite resource and to accept a responding communication from any accepting concurrent users reserving at least one composite resource. At least one selected non-computer composite resource may be employed in prepared food industries.

One aspect of the present invention provides a computer-readable medium containing program instructions for controlling a computer to perform a method. The method comprises accepting data related to individual resources and associated non-computer composite resources, wherein the associated composite resources each include a collection of at least two of the individual resources. The method comprises storing the data related to the individual resources and the associated composite resources. The method comprises constructing internal data structures which link each of the individual resources to their associated composite resources and link each of the composite resources to their associated individual resources. The method comprises accepting a list array of at least one potential concurrent user of at least one selected composite resource. The method comprises communicating to a list array of at least one potential concurrent user of a selected composite resource, an invitation to participate in the use of at least one composite resource. The method comprises accepting a responding communication from any accepting concurrent users reserving at least one composite resource. The method comprises storing any accepting concurrent user reservations using the internal data structures for at least one composite resource. At least one selected non-computer composite resource may be employed in prepared food industries.

One aspect of the present invention provides a computer-based method for producing composite resource transactions. The method comprises accepting a list array of potential concurrent users of at least one selected non-computer composite resource. The method comprises communicating to a list array of at least one potential concurrent user of at least one composite resource, an invitation to participate in the use of at least one composite resource. The method comprises accepting a responding communication from any accepting concurrent users binding at least one composite resource. At least one selected non-computer composite resource may be employed in prepared food industries.

One aspect of the present invention provides a computer-based method for list bid price management. The method comprises storing transaction parameter values for composite resources. The method comprises accepting at least one list bid price for the stored transaction parameter values of at least one composite resource or transaction parameter value type. The method comprises accepting transaction parameter values or value ranges from a prospective user of the composite resources comprised of the stored transaction parameter values. The method comprises determining which stored transaction parameter values for composite resources have reservable quantities which most closely match the accepted user transaction parameter values or value ranges. The method comprises placing in a list array transaction parameter values for reservable composite resources most closely matching the prospective user's transaction parameter values or value ranges. The method comprises ordering reservable composite resources within the list array based on an algorithm which assigns the first list position to the composite resource with associated stored transaction parameter values possessing the highest list bid price, with subsequent positions on the list being assigned to subsequent highest list bid prices exclusive of already-positioned composite resources and their associated stored transaction parameter values. The method comprises determining a list acceptance price for at least one selected composite resource with associated stored transaction parameter values within the list array. At least one selected composite resource may be employed in prepared food industries.

One aspect of the present invention provides a computer-based system for list bid price management. The system comprises means for storing transaction parameter values for composite resources. The system comprises means for accepting at least one list bid price for the stored transaction parameter values of at least one composite resource or transaction parameter value type. The system comprises means for accepting transaction parameter values or value ranges from a prospective user of the composite resources comprised of the stored transaction parameter values. The system comprises means for determining which stored transaction parameter values for composite resources have reservable quantities which most closely match the accepted user transaction parameter values or value ranges. The system comprises means for placing in a list array transaction parameter values for reservable composite resources most closely matching the prospective user's transaction parameter values or value ranges. The system comprises means for ordering reservable composite resources within the list array based on an algorithm which assigns the first list position to the composite resource with associated stored transaction parameter values possessing the highest list bid price, with subsequent positions on the list being assigned to subsequent highest list bid prices exclusive of already-positioned composite resources and their associated stored transaction parameter values. The system comprises means for determining a list acceptance price for at least one selected composite resource with associated stored transaction parameter values within the list array. At least one selected composite resource may be employed in prepared food industries.

One aspect of the present invention provides a capacity/demand management system. The system comprises a storage device storing a program. The system comprises a processor connected to the storage device and controlled by the program, the processor operative with the program to store transaction parameter values for composite resources, to accept at least one list bid price for the stored transaction parameter values of at least one composite resource or transaction parameter value type, to accept transaction parameter values or value ranges from a prospective user of the composite resources comprised of the stored transaction parameter values, to determine which stored transaction parameter values for composite resources have reservable quantities which most closely match the accepted user transaction parameter values or value ranges, to place in a list array transaction parameter values for reservable composite resources most closely matching the prospective user's transaction parameter values or value ranges, to order reservable composite resources within the list array based on an algorithm which assigns the first list position to the composite resource with associated stored transaction parameter values possessing the highest list bid price, with subsequent positions on the list being assigned to subsequent highest list bid prices exclusive of already-positioned composite resources and their associated stored transaction parameter values, to determine a list acceptance price for at least one selected composite resource with associated stored transaction parameter values within the list array. At least one selected composite resource may be employed in prepared food industries.

One aspect of the present invention provides a computer-readable medium containing program instructions for controlling a computer to perform a method. The method comprises storing transaction parameter values for composite resources. The method comprises accepting at least one list bid price for the stored transaction parameter values of at least one composite resource or transaction parameter value type. The method comprises accepting transaction parameter values or value ranges from a prospective user of the composite resources comprised of the stored transaction parameter values. The method comprises determining which stored transaction parameter values for composite resources have reservable quantities which most closely match the accepted user transaction parameter values or value ranges. The method comprises placing in a list array transaction parameter values for reservable composite resources most closely matching the prospective user's transaction parameter values or value ranges. The method comprises ordering reservable composite resources within the list array based on an algorithm which assigns the first list position to the composite resource with associated stored transaction parameter values possessing the highest list bid price, with subsequent positions on the list being assigned to subsequent highest list bid prices exclusive of already-positioned composite resources and their associated stored transaction parameter values. The method comprises determining a list acceptance price for at least one selected composite resource with associated stored transaction parameter values within the list array. At least one selected composite resource may be employed in prepared food industries.

One aspect of the present invention provides a computer-based method for producing composite resource transactions. The method comprises storing transaction parameter values for composite resources. The method comprises accepting at least one list bid price for the stored transaction parameter values of at least one composite resource or transaction parameter value type. The method comprises accepting transaction parameter values or value ranges from a prospective user of the composite resources comprised of the stored transaction parameter values. The method comprises determining which stored transaction parameter values for composite resources have reservable quantities which most closely match the accepted user transaction parameter values or value ranges. The method comprises placing in a list array transaction parameter values for reservable composite resources most closely matching the prospective user's transaction parameter values or value ranges. The method comprises ordering reservable composite resources within the list array based on an algorithm which assigns the first list position to the composite resource with associated stored transaction parameter values possessing the highest list bid price, with subsequent positions on the list being assigned to subsequent highest list bid prices exclusive of already-positioned composite resources and their associated stored transaction parameter values. The method comprises determining a list acceptance price for at least one selected composite resource with associated stored transaction parameter values within the list array. At least one selected composite resource may be employed in prepared food industries.

One aspect of the present invention provides a computer-based method for composite resource utilization. The method comprises accepting transaction parameter values for composite resources from a list array of concurrent users, the array including only one initiating user. The method further comprises associating each of the selected transaction parameter values to a concurrent user from the array of concurrent users. The transaction price parameters for the composite resources utilized may be remunerated by at least two users from the list array of concurrent users.

One aspect of the present invention provides a computer-based system for composite resource utilization. The method comprises means for accepting transaction parameter values for composite resources from a list array of concurrent users, the array including only one initiating user. The method further comprises means for associating each of the selected transaction parameter values to a concurrent user from the array of concurrent users The transaction price parameters for the composite resources utilized may be remunerated by at least two users from the list array of concurrent users.

One aspect of the present invention provides a transaction split-order system comprising a storage device storing a program and a processor connected to the storage device and controlled by the program, the processor operative with the program to accept transaction parameter values for composite resources from a list array of concurrent users, the array including only one initiating user. The processor operative with the program to associate each of the selected transaction parameter values to a concurrent user from the array of concurrent users. The transaction price parameters for the composite resources utilized may be remunerated by at least two users from the list array of concurrent users.

One aspect of the present invention provides a computer-readable medium containing program instructions for controlling a computer to perform a method comprising accepting transaction parameter values for composite resources from a list array of concurrent users, the array including only one initiating user. The method further comprises associating each of the selected transaction parameter values to a concurrent user from the array of concurrent users. The transaction price parameters for the composite resources utilized may be remunerated by at least two users from the list array of concurrent users.

One aspect of the present invention provides a method for producing composite resource transactions comprising accepting transaction parameter values for composite resources from a list array of concurrent users, the array including only one initiating user. The method further comprises associating each of the selected transaction parameter values to a concurrent user from the array of concurrent users. The transaction price parameters for the composite resources utilized may be remunerated by at least two users from the list array of concurrent users.

One aspect of the present invention provides a computer-based method for displaying composite resources, comprising accepting transaction parameter value types for at least one composite resource, constructing at least one array of at least two composite resources possessing at least one identical transaction parameter value type, generating at least one array label for each constructed array and displaying at least one generated array label to potential users of at least one composite resource.

One aspect of the present invention provides a computer-based system for displaying composite resources, comprising means for accepting transaction parameter value types for at least one composite resource, means for constructing at least one array of at least two composite resources possessing at least one identical transaction parameter value type, means for generating at least one array label for each constructed array and means for displaying at least one generated array label to potential users of at least one composite resource.

One aspect of the present invention provides a composite resource list label generation system comprising a storage device storing a program and a processor connected to the storage device and controlled by the program, the processor operative with the program to accept transaction parameter value types for at least one composite resource, to construct at least one array of at least two composite resources possessing at least one identical transaction parameter value type, to generate at least one array label for each constructed array and to display at least one generated array label to potential users of at least one composite resource.

One aspect of the present invention provides computer-readable medium containing program instructions for controlling a computer to perform a method comprising accepting transaction parameter value types for at least one composite resource, constructing at least one array of at least two composite resources possessing at least one identical transaction parameter value type, generating at least one array label for each constructed array and displaying at least one generated array label to potential users of at least one composite resource.

One aspect of the present invention provides computer-based method for producing composite resource transactions, the method comprising accepting transaction parameter value types for at least one composite resource, constructing at least one array of at least two composite resources possessing at least one identical transaction parameter value type, generating at least one array label for each constructed array and displaying at least one generated array label to potential users of at least one composite resource.

Still other embodiments of the present invention will become readily apparent to those skilled in the art from the following detailed description, where is shown and described only embodiments of the invention by way of illustration of the wide range of modes contemplated for carrying out the invention. As will be realized, the invention is capable of other and different embodiments and its several details are capable of modification in various obvious respects, all without departing from the scope of the present invention. Accordingly, the drawings and detailed description are to be regarded as illustrative in nature and not as restrictive.

A prepared-food service management system overcomes the barriers to the elimination or higher utilization of composite resources in existing prepared-food service industries. Through utilization of a computer-based prepared-food service management system, prepared-food service industries can modify transaction prices to better match demand for composite resources possessing specified transaction parameters, such as composite resource, resource network, resource network location, and transaction date/time, with the available supply of composite resources. Alternatively, through utilization of a computer-based prepared-food service management system, prepared-food service industries can modify the available capacity or supply of composite resources to meet the demand for the composite resources or to reduce service costs. The end result is more profitable user transactions and improved prepared-food resource utilization.

BRIEF DESCRIPTION OF THE DRAWINGS

FIG. 3A is a reservation process flow diagram.

FIGS. 3B-3C are visual user interfaces used by users, an embodiment of user interfaces in the transaction reservations system of FIG. 2.

FIG. 3D is a payment process flow diagram.

FIGS. 4A-4D are visual resource interface used by resource network managers, an embodiment of interfaces to a resource network reservations system in the transaction reservations system of FIG. 2.

FIG. 5 shows data structures used by the capacity/demand management system of FIG. 2.

DETAILED DESCRIPTION OF THE PREFERRED EMBODIMENTS

I. Glossary of Terms

Figure 1:
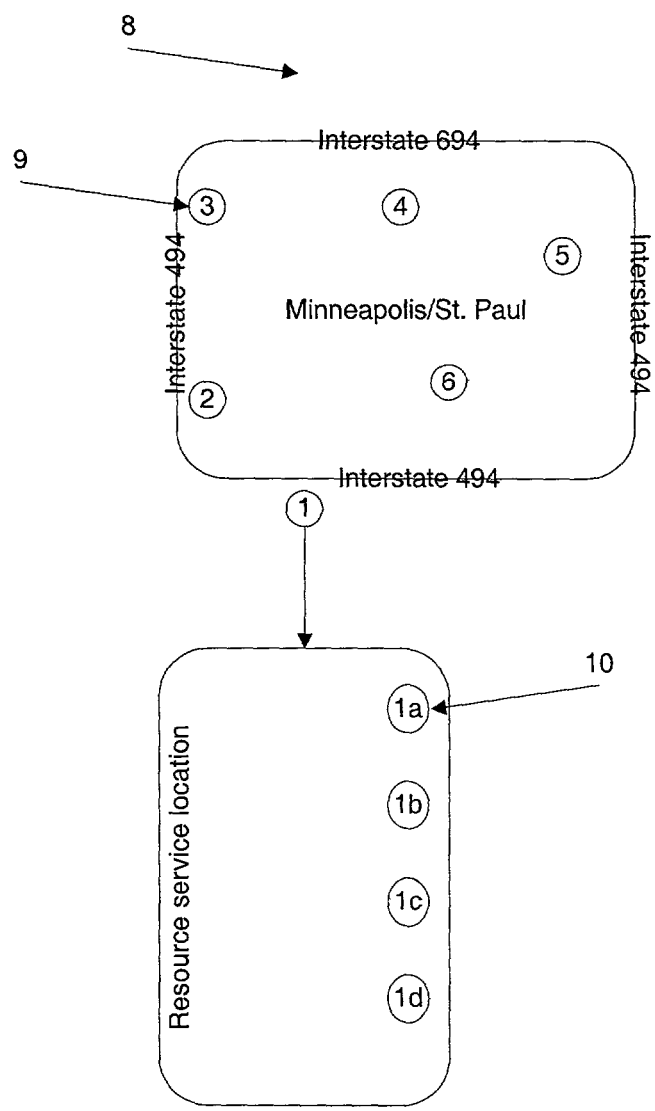
FIG. 1 is, by way of example, an outline map of the topology for a simple resource network.

Attention-eliciting method" refers to any of a number of methods that excite the sensory organs to draw attention to a particular item, whether visual, auditory, olfactory, organoleptic or through the sense of touch. Common attention-eliciting methods currently being used in the field of electronic commerce, by way of example, include: differing the appearance relative to nearby visual objects, shading, texturing, embossing, causing to appear sunken, enlarging, shrinking, movement, causing to appear (for example, in a pop-up message) or disappear, flashing, requiring user-action (as in a keystroke, mouse click or other method), communicating an auditory signal or message or through textured surfaces intended to communicate meaning (as in the Braille alphabet or the raised surfaces on the J-key, F-key or 5-digit of a keyboard).

"Composite resource" refers to a collection of resources that a user typically will purchase as a bundle at a single price. For example, dine in restaurant service is a composite resource that may be made up of the restaurant, tables, reservationists, cooks, waitstaff, wine porters, raw food materials, cooking implements, specialized pieces of equipment and the like. Although all transactions involve a mix of land, labor and capital resources, traditionally some composite resources, such as dine in restaurant services, have been typically described as requiring a single resource (i.e., food or a table). Such transactions are actually composite resources and are classified as such in this invention.

"Computer-based communications" refers to any and all forms of communication between computing devices (such as computers, television two-way communication devices, mobile phones, analog phones, PSTN phones, two-way radio devices, PDAs, PDCs and the like). Communications represent the exchange of data through land-based (PSTN, ISDN, FDDI, T-1, T-3, ATM, Frame Relay, SMDS, SNA, Ethernet, Fast Ethernet, MBONE, IP, RSVP, CAP, TCP/IP, other telephony, other cable, other fiber optics and the like), mobile and radio frequency systems (GSM, AMPS, FDMA, CDMA, TDMA, iDEN, PDC, packet radio network, other mobile and radio frequency (RF) systems and the like) and protocols (LMDS, DECT, MAC, microwave, wireless local loop, GPRS, PPDC, SMS, CDMA, PCS, satellite-based, IrDA, FastInfrared, Serial Infrared, 3G, Bluetooth, SWAP, WAP, Symbian, EDGE, X.25, MGCP, H.323, SIP, PCI, CompactPCI, PMC, xDSL, T1/E1, HSSI, DS3/E3 and OC-3, PPP, Frame Relay and ATM, DAVIC/DVB, MCNS and the like). Still other forms of computer-based communications will become readily apparent to those skilled in the art without departing from the spirit and scope of the present invention. Accordingly, the examples offered are to be regarded as illustrative in nature and not as restrictive.

"Demand forecast" represents a prediction of the number of resource or composite resource transactions that users will request to reserve for a future set of transaction parameters (among them, date/time and transaction price) specified by statistical parameters, such as mean and variance. It also can include forecasts of cancellations and no-shows.

"Initiating user" refers to the user within a list array of concurrent users who is "hosting" an occasion where composite resources are utilized. Within the scope of the present invention, it generally means the individual or entity under whose name a composite resource reservation is reserved, such as for a restaurant reservation. In contrast to initiating users are other initiating entities such as the initiators of university class seating and of preferred sports playoff seating, wherein the initiators are producers or purveyors of the composite resources being utilized. In the present invention, an initiating user is not a producer or purveyor of the composite resources being reserved or utilized.

"List acceptance price" refers to an offer price, equal to or lower than the list bid price, at which a composite resource with specified transaction parameter values or offers is accepted for placement on the user list. In the present embodiment, the list acceptance price is equal to the list bid price when a competing composite resource's list bid price is equal to the composite resources own list bid price, or the value of the next highest competing list bid price, plus a monetary unit increment.

"List bid price" refers to an offer price for placement on a user list calculated using yield management techniques or established by a resource network manager.

"List position" refers to the position of items on a list relative to other items on the same list. A list position may be occupied by a resource network, a resource network location, a composite resource or a composite resource comprised of specified transaction parameter values.

"List reservation price" refers to the list acceptance price of the composite resource with specified transaction parameter values selected by a prospective user.

"Means for communicating" refers to any and all methods of communication between two parties desiring to make a transaction. Such means include, by way of example, price lists, price boards, price quotes, verbal communications or computer-based communications. Still other methods comprising means of communicating for the present invention will become readily apparent to those skilled in the art without departing from the spirit and scope of the present invention. Accordingly, the examples offered are to be regarded as illustrative in nature and not as restrictive.

"Memory" refers to information stored on storage media comprising magnetic tape, magnetic disk, optical disc, compact disc (CD), digital video disc (DVD), hard disk, floppy disk, ferroelectric memory, electrically erasable programmable read only memory (EEPROM), flash memory, EPROM, read only memory, static random access memory (SRAM), dynamic random access memory (DRAM), ferromagnetic memory, optical storage, charge coupled devices, smart cards, transistor-configured IC memory and the like. Still other forms of storage media will become readily apparent to those skilled in the art without departing from the spirit and scope of the present invention. Accordingly, the examples offered are to be regarded as illustrative in nature and not as restrictive.

"Monetary unit increment" refers to an amount added to a list bid price to make it higher than the next lowest list bid price. By way of example, a monetary unit increment in the United States might have a value of $0.01.

"Profiling" refers to a method whereby a user, user network, resource or resource network queries the stored profile of another user, user network, resource or resource network.

"Reservation" refers to the assignment of a resource, composite resource, promotional offer or meal components to a user or transaction. Such a reservation could be made at any time prior to the use of the resource, composite resource or promotional offer, even up to the very instant before its use.

"Resource" refers to a factor of production. Historically, the three factors of production have fallen into the generalized categories of land, labor and capital.

"Resource network" refers to the collection of resources used by an entity to form composite resources, which are then made available for use to users. Examples of resource networks range in size from networks comprising thousands of geographically dispersed resources performing hundreds of unique composite resources to a single resource (since even a single resource has embedded sub-resources of land, labor and capital resources) capable of performing a single composite resource.

"Resource network manager" refers to a person or system managing individual and composite resources within a resource network.

"Transaction parameters" refers to a set of variables describing composite resources. Transaction parameters include, but are not limited to, transaction price parameters, composite resource availability (date/time) parameters, and various profile (described below) parameters. In the present invention, transaction parameter values as frequently represent themselves as a transaction price discount as they do a transaction price.

"Transaction parameter value type" refers to any common characteristic by which a collection of transaction parameter values for composite resources or for prospective users can be grouped. Examples of transaction parameter value types include: time window, order type (dine in, carry-out, delivery), count type (patron, items, etc.), order minimum, online service type, specific product type, product category type, specific staff type, staff category type, user occasion type and user type.

"Transaction price" refers to a collection of goods, services and monetary value requested by one party to a transaction in exchange for another collection of goods, services and monetary value they desire to exchange. Capacity/demand management systems generally match supply and demand for a particular composite resource by modifying transaction prices. Such modification may take the form of a modified monetary value or a modification in the collection of goods or services transacted. Modified monetary values are often implemented by price changes, price discounts or premiums, price rebates or other monetary value-modifying methods. Modification of the collection of goods and services often include offering higher or lower-value goods or services, offering additional free goods or services or other good or service-modifying methods.

"Transaction price parameters" refers to at least one variable reflecting the price of a composite resource. These parameters might reflect the actual transaction price or a relationship to a transaction list price. For example, the transaction price parameters for a composite resource that might be generically described as a delivered pizza could have a transaction parameter price of $9.99 or, alternatively, could have a transaction parameter price of 20% off the standard composite resource list price. In the present invention, transaction price parameter values as frequently represent themselves as a transaction price discount as they do a transaction price.

"User profile" or "user network profile" or "resource profile" or "composite resource profile" or "resource network profile" refers to a collection of demographic, psychographic, attitudinal, preference, performance, qualification, geographic, geocode, historical transaction and other variables used for facilitating optimal transactions. For example, a user may desire to transact with a specified sub-group of resource networks, which have a user-based performance rating of 4.5 or greater on a 5.0 scale, which transact business within 5 miles of the user's home or place of work, which have availability between 3:30 p.m. and 5:00 p.m. on Wednesday May 16, 2000. One of the plurality of composite resources fitting that description may desire to transact only with users who are over the age of 21 or who are members of a purchase-frequency club.

"Yield management" or "Revenue management" refers to "a multiperiod [transaction] pricing strategy in which each [transaction] price is a function of forecasted excess capacity" (See Ramarao Desiraju & Steven M Shugan, Strategic Service Pricing and Yield Management, 63 Journal of Marketing 1, pp. 44-56 (1999), incorporated herein by reference). Sheryl Kimes in "Yield Management: A Tool for Capacity-Constrained Service Firms." Journal of Operations Management 8, no. 4 (1989): p. 348-363, the disclosure of which is incorporated herein by reference) highlights several classes of solution techniques, which she generally categorizes as: mathematical programming, economics-based, threshold curve and expert systems. Although each method of implementing yield management may require an entirely different calculation system, all methods of implementing yield management techniques in a computer-based system perform the exact same function, namely, attempting to better match the supply of a resource to the demand for a resource.

II. Capacity/Demand Management System

A. Network Topology

FIG. 1 shows, by way of example, an outline map of the topology for a simple resource network 8. The resource network 8 comprises a plurality of resource service locations 9 (represented by 1, 2, 3, 4, 5, and 6 in the diagram), with each service location being composed of a plurality of composite resources 10 (represented by 1*a*, 1*b*, 1*c* and 1*d* in the diagram). These composite resources 10 could, by way of example, be any composite resources used in the provision of prepared food services and might even bear names indicative of a single resource comprising the composite resource as in a table, a staffperson or a reservation, among other things.

B. Transaction Reservations System

Figure 2:
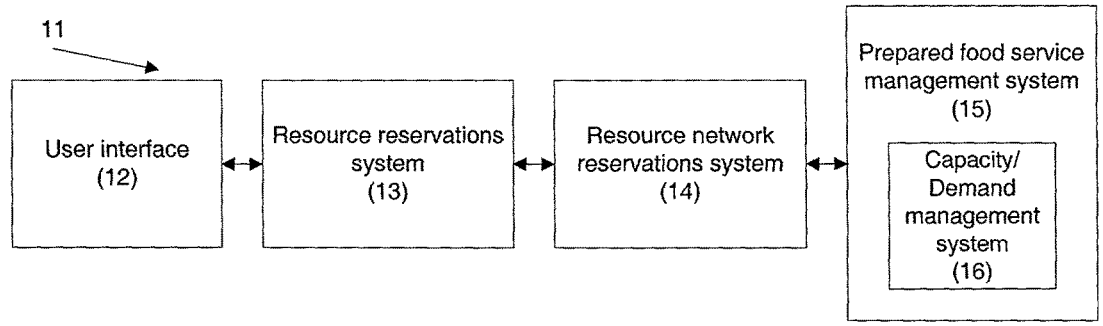
FIG. 2 is a functional block diagram of a transaction reservations system.

FIG. 2 is a functional block diagram of a transaction reservations system 11, used, by way of example, for granting or denying the reservation of transactions based on marginal values. The transaction reservations system 11 comprises five components: a user interface 12, a resource reservations system 13, a resource network reservations system 14, a prepared food management system 15 and a capacity/demand management system (CDMS) 16. Although only one of each type of component is shown, a typical human-factor transaction reservations system 11 would comprise multiple user interfaces 12, resource reservations systems 13, resource network reservations systems 14, resource revenue management systems 15 and capacity/demand management systems 16.

Each resource reservations system 13, resource network reservations system 14, prepared food management system 15 and capacity/demand management system 16 can be embodied as a general purpose programmed computer system (not shown) that operates on a set of instructions in the form of a computer program. Such a general purpose programmed computer system contains a central processing unit, volatile memory, secondary storage and other components conventional in the art, including a cathode ray tube (CRT) or other type of display and a keyboard entry device.

Each user interface 12 is, by way of example, a conventional personal computer or other digital device (see Computer-based communications, above) having an input device, such as a keyboard, mouse, touchpad, stylus, or voice recognition software package; a display device (optional), such as a video monitor; a processing device such as a CPU; and a network interface such as a modem or digital or optical switch. Alternatively, user interface 12 may also include wireless communication systems, voice mail systems, other electronic or voice communications systems, fax machines or pagers.

The user interface 12 is used for submitting availability and reservations requests to the resource reservations system 13 and for receiving data in reply from the resource reservations system 13. An availability request queries, by way of example, whether a composite resource 10 possessing a defined profile is available for possibly different service times or whether a plurality of composite resources 10 possessing a defined profile within multiple resource networks 9 are available for a specified service time. A reservation request specifically asks for a reservation for a composite resource 10 or a plurality of composite resources 10. There may be multiple resource network reservations systems 14 associated with the resource reservations system 13. To determine the availability of reservable time, the resource reservations system 13 sends availability and reservation requests to each resource network reservations system 14 involved in the user's request. Information about the resources 10, including their associated resource location 9 in the resource network 8 (shown in FIG. 1) is, by way of example, managed and stored in the resource network reservations system 14. Such information is accessible by the user interface 12 and the resource reservations system 13 for the profiling and selection of individual resources 10, the resource networks 8 and the plurality of resource networks exchanging information with the resource reservations system 13.

The resource network reservations system 14 accepts, counter-offers or denies the reservation requests that it receives from the resource reservations system 13 or a locally-connected terminal (not shown) based on various factors, including information received from the prepared food service management system 15. The prepared food service management system 15 calculates resource availability according to profiling information and service time and processes reservation requests using stored capacity and demand information.

Part of the prepared food service management service system 15 is the capacity/demand management system (CDMS) 16. In the described embodiment, the CDMS 16 is a computer program that is executed by the prepared food service management system 15. It is also envisioned that the CDMS 16 can be a special purpose computer formed on an integrated circuit chip (or set of chips) or executable computer code burned into a read-only memory (ROM) chip that can be read in by conventional means or as microcode.

In a preferred embodiment, the purpose of the CDMS 16 is to store capacity/demand and promotional offer information for use by the prepared food service management system 15. The CDMS 16 periodically receives user values, a demand forecast and the supply of future time segments remaining to be booked for selected resources as inputs from the prepared food service management system 15. This same data could also be retrieved from a storage device (not shown) commonly accessible by both the prepared food service management system 15 and the CDMS 16. A demand forecast predicts the number of reservations that will be made or that is expected to be made between now and the future time segment expressed in terms of statistical parameters, such as mean and variance. The user value is a function of the user profile, the point of sale, the resource and the resource profile. The supply of time segments remaining to be booked is calculated from the capacity of the time segments assigned by the prepared food service management system 15 minus the resources already booked plus an over-reservation factor to account for cancellations and no-shows. The number of resource time segments that can be solved at one time is limited only by the computer memory available. A very large resource network 9 can be solved on a large computer.

In response, the CDMS 16 sends capacity/demand and promotional offer information for the resource time segments selected to the prepared food service management system 15 for immediate use or storage or stores them directly into the commonly accessible storage device (not shown).

In a preferred embodiment, the CDMS 16 also includes links to a revenue management system whereby some transaction parameter values or promotional offer information is calculated. Such a system is described in a concurrent application filed by the present inventor, "System and method employing yield management in human-factor resource industries," incorporated herein by reference.

In the described embodiment, the CDMS 16 is a computer program written in the C++ object-oriented programming language. It is preferably structured as a class library capable of managing at least one resource networks 8 using the same transaction reservations system 11. However, any suitable programming language can be employed and the CDMS 16 can be embodied on any suitable computer system configuration.

Figure 2A:
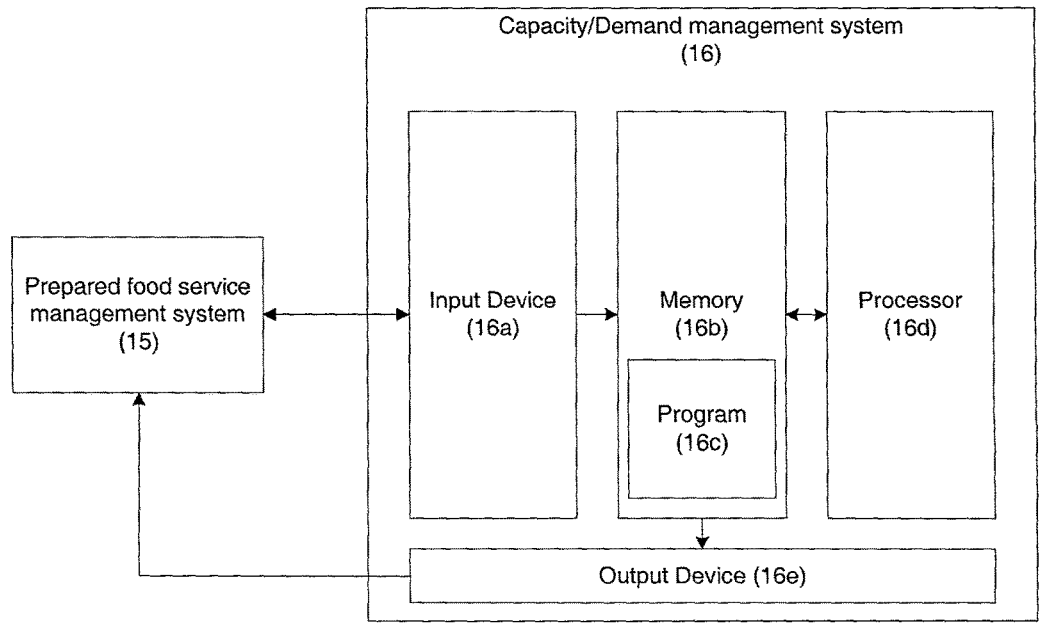
FIG. 2A is a block diagram of a capacity/demand management system.

FIG. 2A is a block diagram of a capacity/demand management system 11. The prepared food service management system 15 links to an input device 16a within the CDMS 16. The input device 16a links to a memory 16b where a program 16c for calculating capacity/demand relationships is stored. The memory 16b links to a processor 16d, the processor using the program 16c and relationships brought into memory 16b through the input device 16a to calculate capacity/demand relationships and return them to the memory 16b. The memory 16b links to an output device 16e, which transmits capacity/demand relationships to the prepared food service management system 15.

Figure 2B:
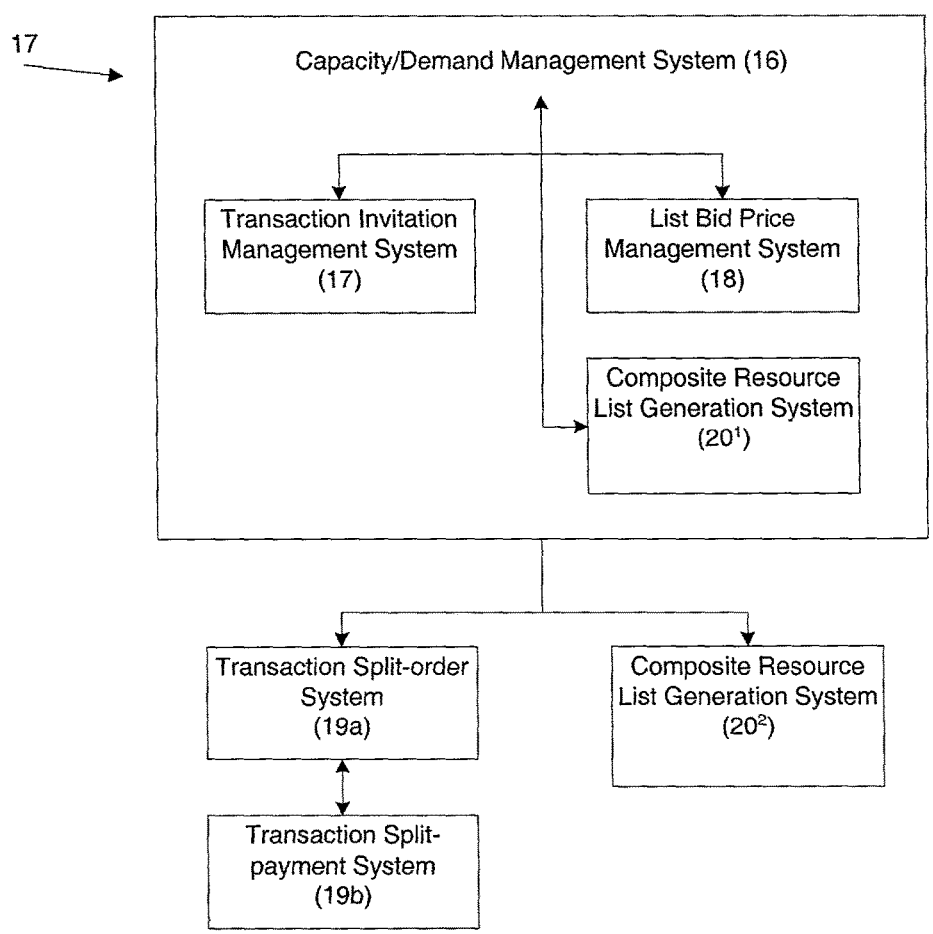
FIG. 2B is a block diagram of a capacity/demand management system.

FIG. 2B is a second block diagram of a capacity/demand management system 11. The CDMS 16 interfaces with two other independent systems, a transaction invitation management system 17 and a list bid price management system. The transaction invitation management system 17 allows potential consumer users of the CDMS to invite other potential users to participate in their transaction. By way of example, a person using the CDMS 16 to book at table at a restaurant might use the transaction invitation management system 17 to invite any number of other persons to join the user at the restaurant. The list bid price management system 18 allows business users to place bids to appear high on lists generated by the CDMS 16 for potential consumer users. The CDMS is extensible, allowing for a plurality of component attachments. Among them, a transaction split-order system 19a with an associated transaction split-payment system 19b allows consumer users to segregate costs associated with composite resources reserved through the CDMS 16 and to segregate payment for composite resources. Also among them, a composite resource list generation system 20, whether internal ($20^1$) to the CDMS 16 or external ($20^2$), enables the grouping of composite resources for display to consumer users into business user-defined categories.

C. User Interface

Figure 3A:
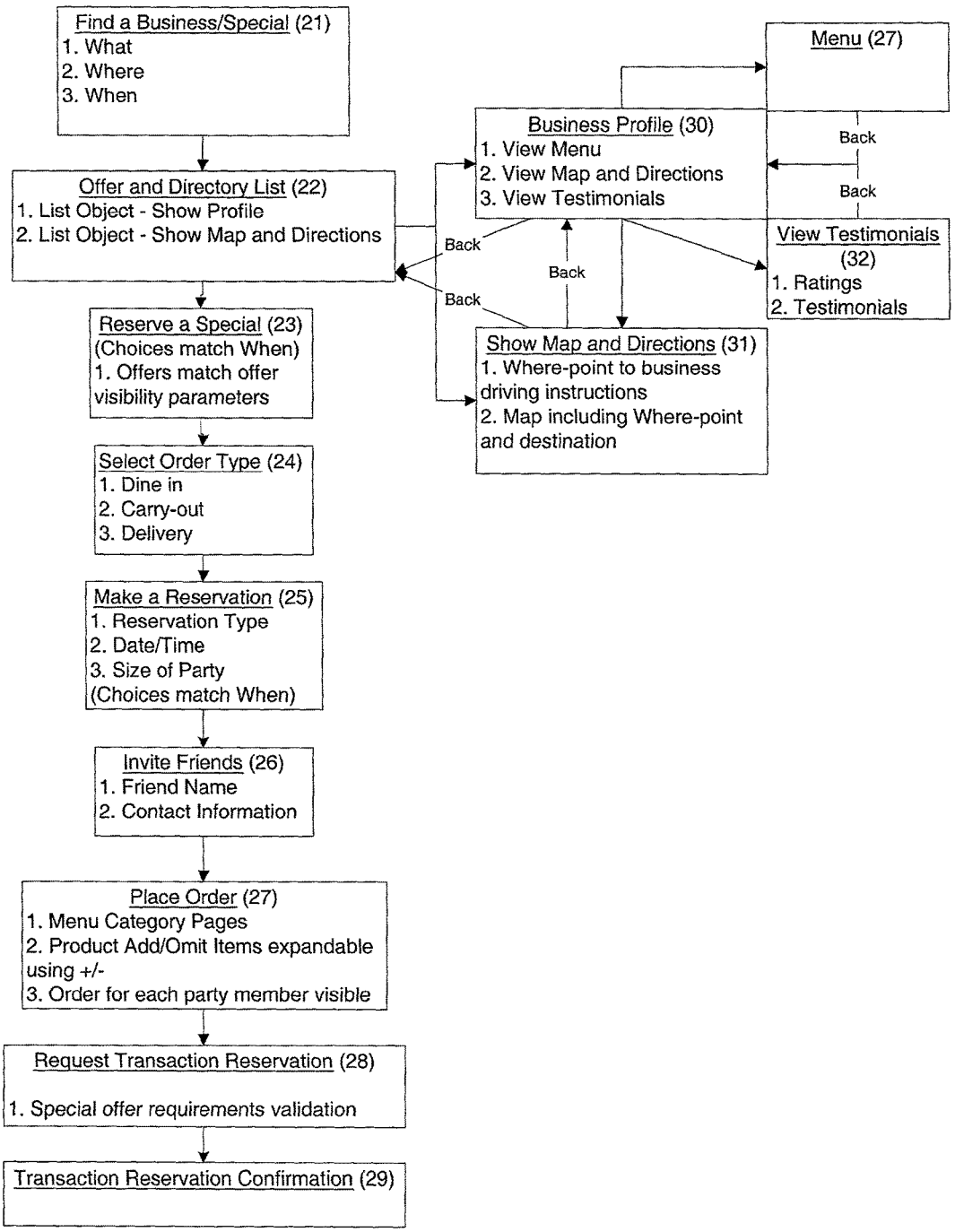
FIG. 3A is a process flow diagram of a consumer user interface 12 in the transaction reservations system of FIG. 2. More specifically.
Figure 3B:
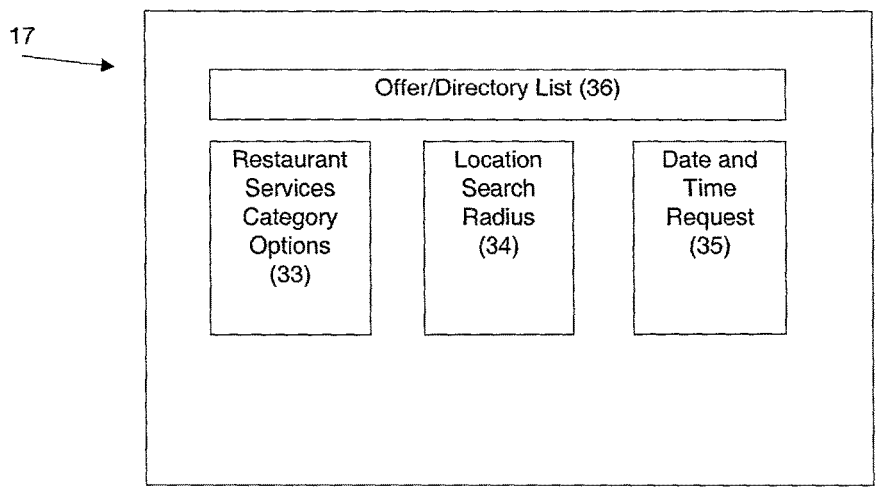

FIG. 3A depicts a process flow diagram of the consumer user interface 12 for reserving composite resources with a prepared food service provider. The process begins with the user selecting the search criteria upon which they desire to see special offers 21. A diagram of the layout of this consumer user interface 12, by way of example, a visual user interface 17, is shown at FIG. 3B, wherein information relating to the criteria Prepared food Services Category Options 33, Location Search Radius 34, Date and Time Request 35 and Offer/Directory List 36 is obtained from the user. These four criteria options are to be regarded as illustrative in nature and not restrictive. One skilled in the art will recognize that any one or plurality of criteria could be obtained from the user for the purpose of generating a list of prepared food service providers matching these criteria without departing from the spirit of the present invention.

Once the criteria are obtained from the user, a list of prepared food service providers matching these criteria is generated 22. The user selects a prepared food service provider from this list and then reserves, if applicable, a special offer being offered by the selected prepared food service provider 23. If this prepared food service provider offers it's service through multiple service channels (dine in, carry-out, delivery, etc.), the user next selects the channel by which they wish to receive service, the order type 24. Following this, the user reserves several of the necessary resources comprising the composite resource through which they will receive service 25 and may indicate at least one additional information items. By way of example, if the selected order type 24 was for delivery service, necessary additional information items would include delivery address information and any special delivery instructions. After reserving the necessary resources, the user may choose to invite other persons to join them in the use of the prepared food services. They do so at the Invite Friends 26 consumer user interface 12.

Following the invitation process 26, the user may place all or part of their order 27. A diagram of the layout of this consumer user interface 12 is shown at FIG. 3C. Herein the composite resources (menu items) available for purchase are listed. Several unique and proprietary features which are integral to the user experience as it relates to reserving menu items include the ability to: segregate orders for the user and other invited members 36; to view items by category 37; to add and remove raw material components from a menu item 38; to give special preparation instructions 39; to purchase a menu item comprising several meal components (entiée, vegetable, starch, bread, etc.,) 40; to view previous user satisfaction ratings of menu items 41; and, to view the most frequently purchased items of previous users 42.

As the final two steps in the reservation process flow described in FIG. 3A, all of the above resource reservation requests (offer, resource, meal components, etc.) comprising the composite resource (dine in order, carry-out order, etc.,) are transmitted to the resource network reservations system 15. Included with this request is user payment information, such as bank account or credit card information. The resource network reservations system 15 processes the reservation requests, checking availability, and returns a transaction reservation confirmation 29, a counteroffer (not depicted) or a rejection (not depicted) to the user.

Also described in FIG. 3A are several prepared food service provider and composite resource informational and assessment user interfaces 12. Depicted are a business profile 30, a map and directions profile 31, a prepared food service provider menu 27, and a user interface displaying the performance measurement results and testimonials of previous users 32. Other informational and assessment user interfaces 12 could also be used without departing from the spirit of the present invention.

Figure 3D:
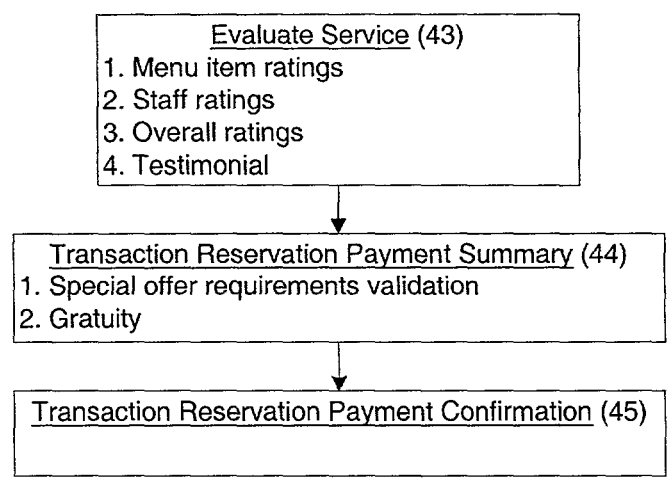
FIG. 3D is a process flow diagram of the consumer user interface 12 in the transaction reservations system of FIG. 2. More specifically.

FIG. 3D depicts a process flow diagram of the consumer user interface 12 for making payment for utilized composite resources of a prepared food service provider. Depicted are a service evaluation user interface 43, a transaction reservation payment summary 44, and a transaction reservation payment confirmation 45. By way of example, the service evaluation user interface 43 allows the user to rate menu items, staff and the prepared food service provider. It further allows the user to provide testimonial information regarding their experience with the prepared food service provider. The transaction reservation payment summary 44 validates that the user has satisfied the criteria to receive any special offers they had previously reserved or for which they are otherwise eligible. Further, if the user desires to add or modify their manner of payment, they would do so here. The transaction reservation payment confirmation 45 informs the user that their transaction is complete and that payment will be handled in the manner the user has proscribed.

In another embodiment of the present invention, the user interface 12 comprises a visual user interface 17 displaying an offer list.

In another embodiment of the present invention, the user interface 12 comprises a visual user interface 17 displaying a reservation availability list.

In another embodiment of the present invention, the user interface 12 comprises a visual user interface 17 displaying a composite resource availability list.

In another embodiment of the present invention, the user interface 12 comprises a visual user interface 17 displaying a composite resource list.

In another embodiment of the present invention, the user interface 12 is a human agent.

In another embodiment of the present invention, the user interface 12 is a voice response interface.

In another embodiment of the present invention, the user interface 12 is a heads-up display screen.

In another embodiment of the present invention, the user interface 12 is a numeric display screen.

In another embodiment of the present invention, the user interface 12 is an alphanumeric display screen.

In another embodiment of the present invention, the user interface 12 is an e-mail messaging system.

In another embodiment of the present invention, the user interface 12 is a task status communication system.

In another embodiment of the present invention, the user interface 12 is a fax communication system.

In another embodiment of the present invention, the user interface 12 is a holographic or other multidimensional system.

In another embodiment of the present invention, the user interface 12 is a visual imaging visor.

In another embodiment of the present invention, the user interface 12 is a retinal imaging system.

Still other embodiments of a user interface 12 will become readily apparent to those skilled in the art. It has herein been shown and described only embodiments of the invention by way of illustration of the wide range of modes contemplated for carrying out the invention. As will be realized, the user interface is capable of other and different embodiments and its several details are capable of modification in various obvious respects, all without departing from the spirit and scope of the present invention. Accordingly, the detailed descriptions above are to be regarded as illustrative in nature and not as restrictive.

D. Resource Network Capacity/Demand Management System

Figure 4A:
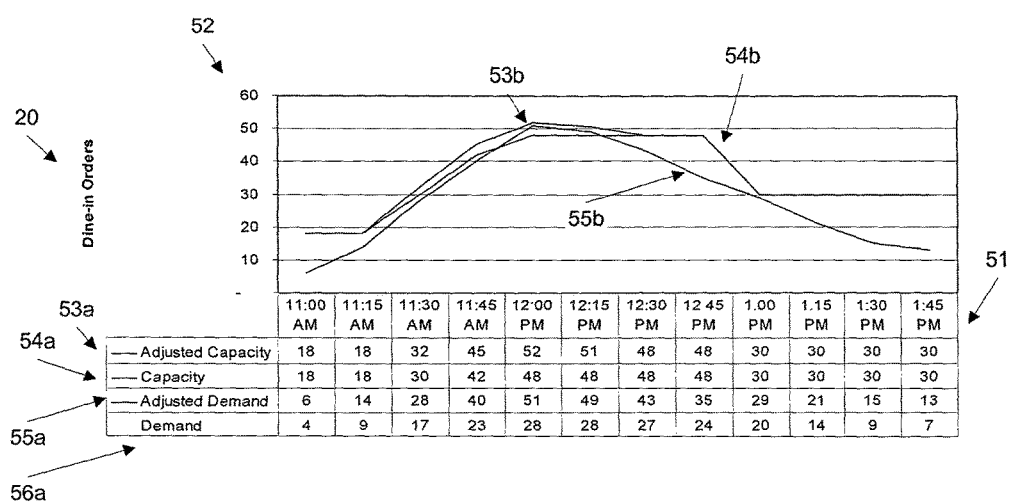

FIG. 4A is a visual resource interface 20 to a resource network capacity/demand system 16. In the described embodiment, the visual resource interface 20 is a chart. The X-axis displays fifteen-minute time segments (although other intervals could be used) between 11:00 a.m. and 2:00 p.m. 51. The Y-axis displays the demand or capacity for a particular resource or composite resource 52. In the described embodiment, the chart depicts the capacity and demand relationship for the composite resource, dine-in order, and a specific resource that is a component of this composite resource (in this instance, waitstaff). Chart data 53*a*, 54*a*, 55*a*, and 56*a*, along with corresponding chart lines 53*b*, 54*b* and 55*b* describe the adjusted capacity of the waitstaff resource, the capacity of the waitstaff resource, the adjusted demand of the waitstaff resource and the demand of the waitstaff resource. The difference between adjusted capacity and capacity and between adjusted demand and demand is described in FIG. 4B.

Figure 4B:
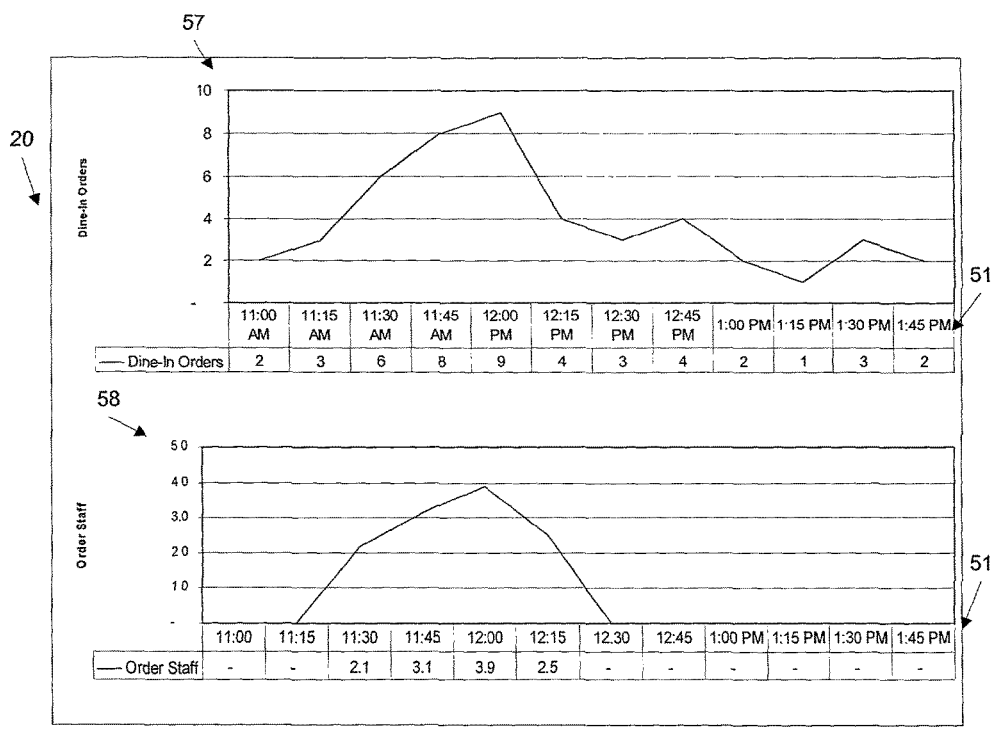

FIG. 4B is another visual resource interface 20 to a resource network capacity/demand system 16. In the described embodiment, the visual resource interface 20 comprises two charts. Both X-axis' display fifteen-minute time segments between 11:00 a.m. and 2:00 p.m. 51. The Y-axis of the top chart displays the incremental demand generated from the impacting capacity/demand system-driven activities 57. The Y-axis of the bottom chart displays the incremental capacity generated from the same impacting capacity/demand system-driven activities 58. In the described embodiment, the two impacting capacity/demand system-driven activities resulting in the incremental demand and the incremental capacity are a 15% promotional offer for service in specified time windows bracketing the lunch-time rush for prepared food services and the capability within the described embodiment to handle online orders (increasing waitstaff service capacity) during the lunch rush.

At least one data elements represented in charts like those of FIG. 4B comprise the difference between adjusted capacity and capacity and between adjusted demand and demand as depicted in FIG. 4A.

FIG. 4C is another visual resource interface 20 to a resource network capacity/demand system 16. In the described embodiment, the visual resource interface 20 comprises a data table. The same fifteen-minute time segments depicted in FIG. 4A and FIG. 4B are shown 51. The data table summarizes the composite resource demand details 58, the resource in-part comprising the composite resource capacity or effort rules 59, the projection or realized calculations for adjusted demand, demand, adjusted capacity and capacity for the composite resource and resource 60, and the projected or realized financial impact of the capacity/demand system-driven activities.

In a preferred embodiment, the resource network capacity/demand system 16 also includes links to a revenue management system whereby some transaction parameter or promotional offer information is calculated. Such a system is described in a concurrent application filed by the present inventor, "System and method employing yield management in human-factor resource industries," incorporated herein by reference.

Additional promotional offers and promotional offer information not calculated using a revenue management system are entered through an exemplary visual resource interface 20 to a resource network capacity/demand system 16 like that described in FIG. 4D. In the described embodiment, the visual resource interface 20 comprises a promotional offer definition table. The offer definition table allows resource network managers to create promotional offers to increase demand for prepared food services. Detailed on FIG. 4D as exemplary examples of input fields are offer description, offer detail description, amount, amount description, user contact interface, visibility parameters, availability parameters, quantity type, quantity, quantity availability duration, offer bid price 62, offer priority, offer restriction type 63 and offer restriction parameters. Other useful input fields would readily present themselves to one skilled in the art.

The offer bid price 62 is used by the resource network managers to bid for priority on the offer and directory list 22. Those placing higher bids appear farther up the list. In the described embodiment, the actual offer bid price paid by a resource network manager is $0.01 more than the offer bid price of the next highest competing bid. Other bid pricing and fixed or variable fee payment mechanisms could readily serve to order prepared food service providers on the offer and directory list 22 without departing from the spirit and scope of the present invention.

Resource network managers may assign at least one offer restriction types 63 to a promotional offer. Each offer restriction type has a unique set of input parameters necessary to implement the restriction. By way of example, the restriction type, Time Window, has as required input parameters, Start Time and End Time. Additional restriction types include Count Type, Order Minimum, Order Type, Online Services, Specific Product, Product Category, Specific Staff, Staff Type, Special Occasion and Patron Type. In the present embodiment, as at least one restriction types may be employed simultaneously in the same promotional offer, myriad combinations of special offers possessing targeted and unique characteristics can be readily envisioned. Further, whole new restriction types can be quickly and easily added to the existing list of restriction types without departing from the spirit and scope of the present invention. Accordingly, the examples offered are to be regarded as illustrative in nature and not as restrictive.

Additional visual resource interfaces 20 to a resource network capacity/demand system 16 not herein described include a capacity rules interface, a staff scheduling interface and a projected base demand interface. Still other visual resource interfaces 20 to a resource network capacity/demand system 16 will become readily apparent to those skilled in the art without departing from the spirit and scope of the present invention. Accordingly, the examples offered are to be regarded as illustrative in nature and not as restrictive.

Although the described embodiment shows the capacity/demand management system measuring the capacity/demand management system displaying in the visual user interface 20 the relationship between composite resource demand and the capacity for one of the resources comprising the composite resource, the visual user interface 20 could also show the relationship between the composite resource demand and the capacity of a plurality of resources comprising the composite resource or the capacity of the most constrained resource comprising the composite resource for any time segment. Further, the visual user interface 20 could show the relationship between the capacity of a resource and the demand for at least one composite resource comprising the demand for that resource.

E. Data Structures

FIG. 5 shows the data structures used by the capacity/demand management system 16. Three major data structures are used: a resource list 72, a composite resource list 73 and a demand records list 74.

The data structure for the resource list 72 comprises resource records 75 containing fields for storing a resource number 76, resource network number 77, resource type 78, resource description 79 and marginal value 80 and quantity 81. The data structure for the composite resource list 73 comprises composite resource records 82 containing fields for storing a composite resource number 83, a resource network number 77, and a composite resource description 84. It also contains fields for identifying the resources that comprise the composite resource, their start time and their duration ($85^{1a}$-$85^{nc}$). A further example of a commercial application functioning as a resource list 72 and composite resource list 73 (referred to as a project) is the desktop project management product licensed under the trademark of Microsoft Project™ manufactured by Microsoft Corporation, Redmond, Wash. Microsoft Project™ is a trademark owned by Microsoft Corporation. The data structure for the demand records list 74 comprises demand records 86 containing fields for storing a composite resource number 83, a resource network number 77, a beginning time interval number 87, an ending time interval number 88, a transaction price 89, a demand mean 90 and a demand variance 91.

Referenced by the resource list 72, the composite resource list 73 and the demand records list 74 is the data structure for a conventional schedule, the visual representation for which is described at User interface and Resource network reservation system (above). For simplicity, the data structures for this list are not shown in FIG. 5.

Referencable by the resource list 72, and the composite resource list 73 are the data structures for at least one profile data tables, with information corresponding to the resource number 76, resource network number 77, resource type 78 or composite resource number 83. For simplicity, the data structures for these lists are not shown in FIG. 5.

Each composite resource in the resource network 8 is divided into its resources stored in the resource list 72. The resource number 76 field uniquely identifies each resource in the resource list 72 and is used to schedule specific resources comprising a composite resource. The resource network number 77 field identifies each resource as belonging to a specified resource network 8, and, together with the resource type 78 field, links the resource list 72 to the composite resource list 73. The resource type 78 field refers to the categorization of the resource as belonging to a class of resources and of having a profile data structure of a specified format. The resource description 79 field textually describes the resource. The marginal value 80 and capacity 81 fields store the marginal value and transaction capacity for the resource. For convenience, the resource records 76 will be referenced whenever a resource is referred to herein below.

The data structure for the composite resource list 73 is comprised of composite resource records 82 and stores all potential transactions executable by a resource network 8. The composite resource number 83 field uniquely identifies each composite resource in the composite resource list. The resource network number 77 field identifies each composite resource as belonging to a specified resource network 8, and, together with the resource network number 77 field, links the composite resource list 73 to the demand records list 74. The composite resource description 84 field textually describes the resource. Three resource workflow fields, the workflow resource number ($85^{1a}$, $85^{2a}$ and $85^{na}$) field, the workflow resource start time ($85^{1b}$, $89^{2b}$ and $85^{nb}$) field and the workflow resource duration ($85^{1c}$, $85^{2c}$ and $85^{nc}$) field store the data required to provide for the coordination of multiple resources in executing a transaction, although further workflow fields are feasible. For convenience, the composite resource records 82 will be referenced whenever a composite resource is referred to herein below.

Several exemplary examples of the manner of data stored in the composite resource list 73 serve to illustrate the variety of methods by which complex tasks can be modeled. Composite resource 118 depicts a recurrence of workflow resource 243 in two time periods. Composite resource 119 depicts a workflow resource start time at a time different from the fifteen minute intervals depicted in FIGS. 4A, 4B and 4C. While composite resource 119 depicts the use of workflow resource 101 in a single set of workflow resource fields, composite resource 120 depicts a similar use of workflow resource 101 over several sets of workflow resource fields. In short, one skilled in the art could represent the workflow resource activities within this composite resource list 73 in myriad ways with out departing from the spirit of the present invention.

The data structure for the demand records list 74 is comprised of demand records 86 and stores the different transaction and statistical parameters from the demand forecast for the corresponding composite resource. The composite resource number 83 links each demand record to a specific composite resource in the composite resource list 73. Two fields, the demand period start time 87 field and demand period end time 86 field retain temporal information concerning the transaction history, although additional temporal and other information is feasible. The transaction prices are stored in the transaction price 89 field in decreasing order. Two statistical parameters, mean and variance, are stored in the mean 90 and variance 91 fields, although further statistical parameters are feasible. Each composite resource record 82 points to one demand records list 74 which contains as many demand records 86 for as many transactions as required. For convenience, the transaction price 89 field will be referenced whenever a particular transaction price is referred to herein below.

For simplicity, various additional data structures have been excluded from FIG. 5. Specific instances, by way of example, of these structures include data fields necessary to consider the resource location of a resource, data fields necessary to consider multiple resource types for a single resource, data fields necessary to treat a resource as both an individual resource and a member of a resource group and data fields necessary to treat a resource as belonging to more than one resource network. Generally these data structures are characterized by modifying what is inherently described in this application as a one-to-many data relationship into a many-to-many data relationship or in allowing a single demand record to be used in determining multiple demand functions.

F. Capacity/Demand Management System

Figure 6:
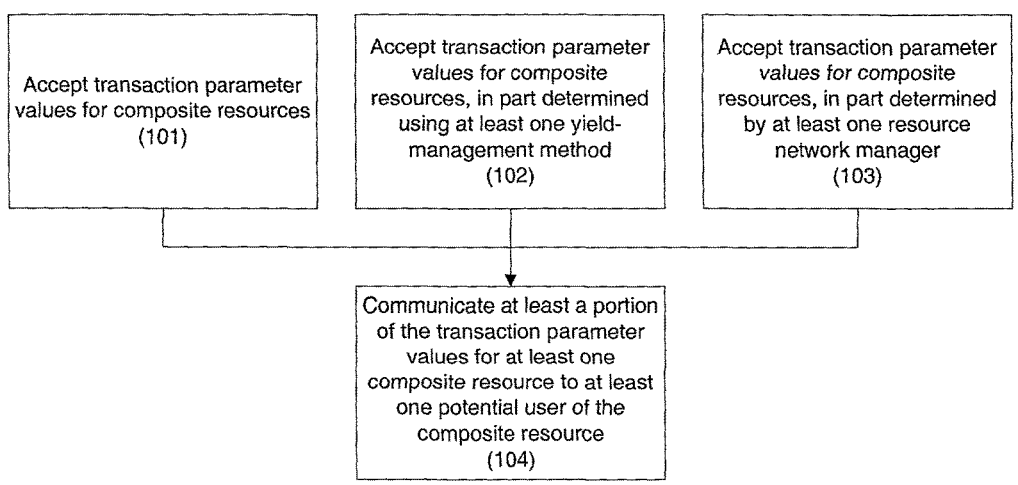
FIG. 6 is a process flow diagram illustrating the operation of the capacity-demand management system of FIG. 2.

FIG. 6 depicts a process flow diagram of the capacity/demand management system 16. The process includes accepting transaction parameter values for composite resources 101. These transaction parameter values may in part be determined using at least one yield-management method 102. These transaction parameter values may in part be determined by at least one resource network manager 103. The process includes communicating at least a portion of the transaction parameter values for at least one composite resource to at least one potential user of the composite resource 104.

G. Transaction Invitation Management System

Figure 7:
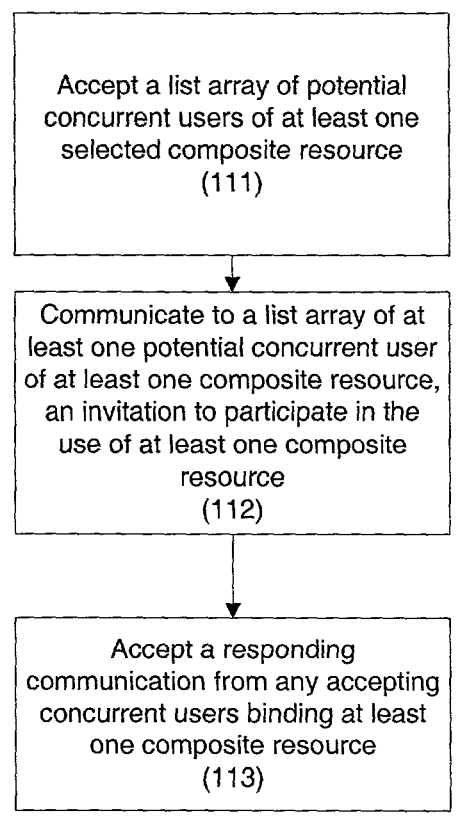
FIG. 7 is a process flow diagram illustrating a transaction invitation management system.

FIG. 7 depicts a process flow diagram of the transaction invitation management system 17 for inviting other users to take part in a potential transaction. The process includes accepting a list array of at least one potential concurrent user of a selected non-computer composite resource 111. The process includes communicating to a list array of at least one potential concurrent user of at least one selected composite resource, an invitation to participate in the use of at least one selected composite resource 112. The process includes accepting a responding communication from any accepting concurrent users reserving at least one composite resource 113.

H. List Bid Price Management System

Figure 8:
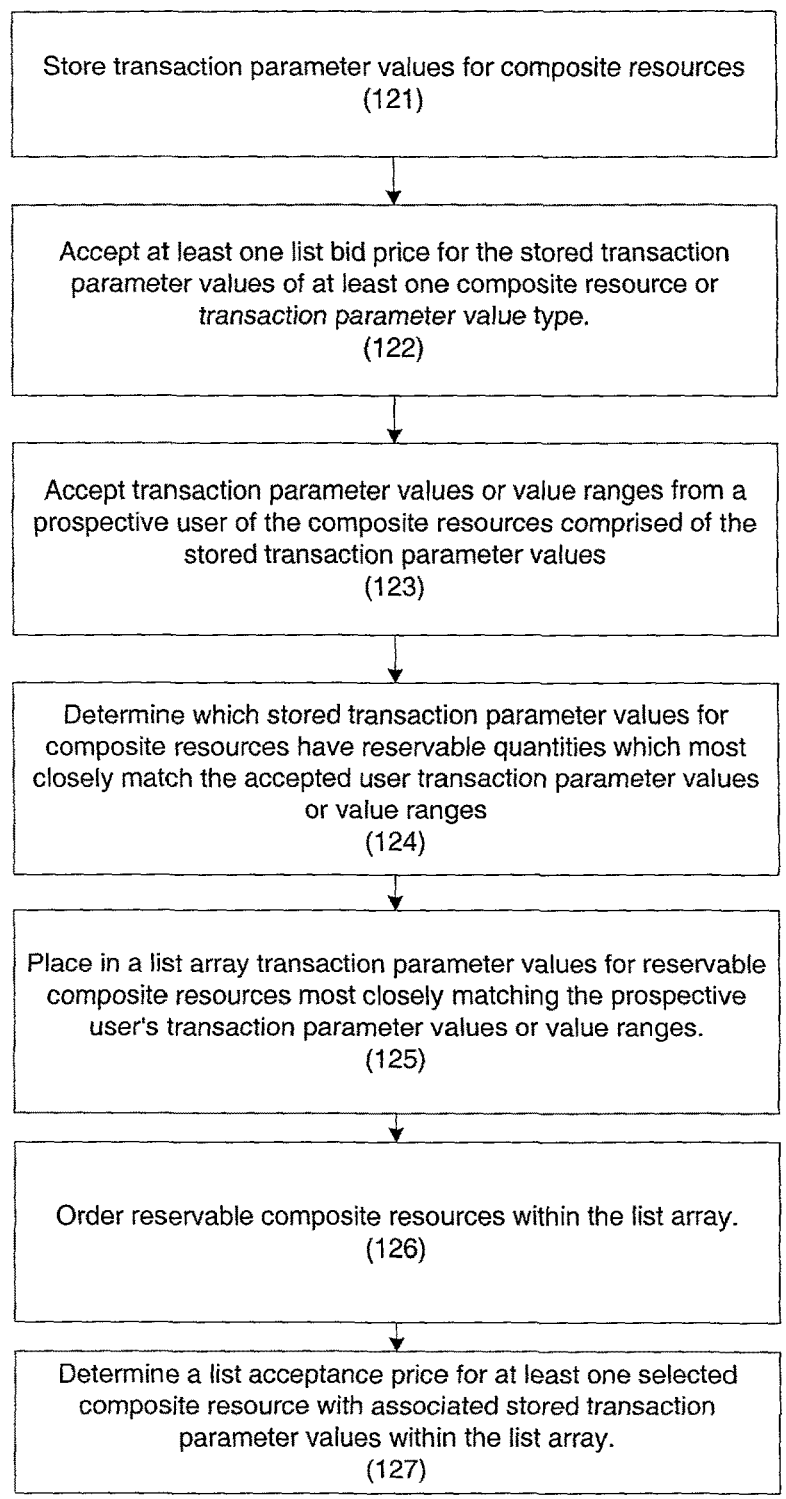
FIG. 8 is a process flow diagram of a list bid price management system.

FIG. 8 depicts a process flow diagram of the list bid price management system 18 used by resource networks to bid for placement on the lists of potential consumers. The process comprises storing transaction parameter values for composite resources 121. The process comprises accepting at least one list bid price for the stored transaction parameter values of at least one composite resource or transaction parameter value type 122. The process comprises accepting transaction parameter values or value ranges from a prospective user of the composite resources comprised of the stored transaction parameter values 123. The process comprises determining which stored transaction parameter values for composite resources have reservable quantities which most closely match the accepted user transaction parameter values or value ranges 124. The process comprises placing in a list array transaction parameter values for reservable composite resources most closely matching the prospective user's transaction parameter values or value ranges 125. The process comprises ordering reservable composite resources within the list array based on an algorithm which assigns the first list position to the composite resource with associated stored transaction parameter values possessing the highest list bid price, with subsequent positions on the list being assigned to subsequent highest list bid prices exclusive of already-positioned composite resources and their associated stored transaction parameter values 126. The process comprises determining a list acceptance price for at least one selected composite resource with associated stored transaction parameter values within the list array 127.

I. Transaction Split-Order/Payment System

Figure 9:
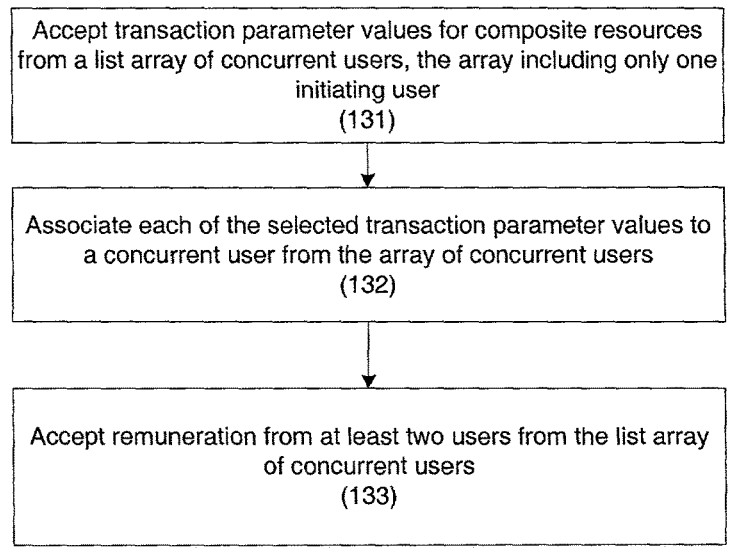
FIG. 9 is a process flow diagram of a transaction split-order/payment system.

FIG. 9 depicts a process flow diagram of the transaction split-order system (19a) and transaction split-payment system (19b) used by consumers to order and pay for composite resource transactions. The process comprises accepting transaction parameter values for composite resources from a list array of concurrent users, the array including only one initiating user 131. The process further comprises associating each of the selected transaction parameter values to a concurrent user from the array of concurrent users 132. When the transaction split-order is linked with the transaction split-payment system, the process may also comprise accepting remuneration from at least two users from the list array of concurrent users 133.

J. Composite Resource List Generation System

Figure 10:
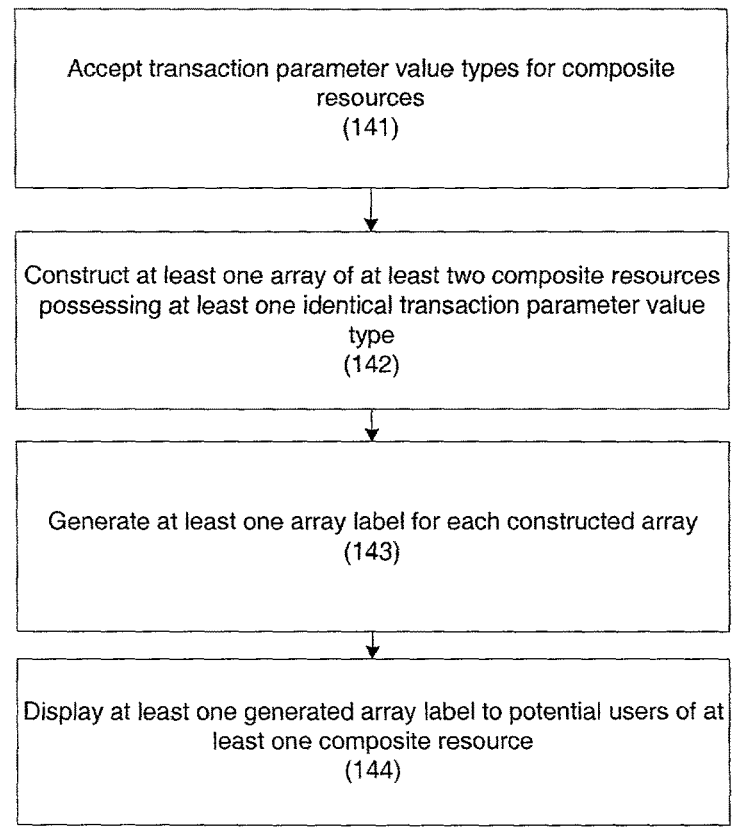
FIG. 10 is a process flow diagram of a composite resource list label generation system.

FIG. 10 depicts a process flow diagram of composite resource list generation system (20$^1$ and 20$^2$) used to generate lists of available composite resource transactions. The embodiment presented in FIG. 10 is a composite resource list label generation system, a specialized type of composite resource list generation system. The process comprises accepting transaction parameter value types for composite resources 141. The process further comprises constructing at least one array of at least two composite resources possessing at least one identical transaction parameter value type 142. The process further comprises generating at least one array label for each constructed array 143. The process further comprises displaying at least one generated array label to potential users of at least one composite resource 144.

EXAMPLES

The following example will serve to describe representative uses for the present invention.

Breakfast

You are the owner of a mid-priced table service restaurant. It's 8:15 a.m., and things are just starting to slow down after the pre-work rush. For other table service restaurants, the remainder of the morning will be slow until lunch, but not for your restaurant. You've partnered with the provider of an innovative capacity/demand management system. Through this system, you offer adults with children a number of selected meal offers available only between 8:30 a.m. and 10:30 a.m. You make similar, lower-discount offers to persons over 55 years old during the same time window. The offers to seniors are of lower-value because the average order price is lower relative to that of an adult with their child or children. Taking advantage of these two offers are fifteen additional breakfast customers, generating $108 in revenue and $50 in profit.

Pre-Lunch Rush

It's now 11:00 a.m., and customers start coming into your restaurant. They've come to your restaurant ahead of the lunch-rush because of the fifteen-percent discount you've offered them. You just got five extra customers and an additional $31 in profit.

Lunch Rush

From 11:30 a.m. to 12:30 p.m., your needs change. Now you want to get your customers served as quickly as possible. The system helps you there too. The system allows your customers to order their meal and pay their bill online. Your customers in a hurry spend 30 minutes in your restaurant rather than 45 minutes and require only four minutes of the waitstaff's time rather than the usual seven and one-half minutes. With just ten orders booked online, total waitstaff effort drops by 35 minutes and 150 additional table minutes are freed up to serve both new and existing customers more quickly. If just 20 lunch orders were placed and paid for online, you could operate with one fewer waitstaff. As it is, you build a reputation for excellent and responsive service, making your restaurant the first choice for lunch-time customers in a hurry. Each additional table order brings $10 in profit to your business.

Post-Lunch Rush

As the lunch rush starts to wind down, the system is there for you. Now you are back to offering fifteen percent discounts to generate new business for your underutilized waitstaff. Since your service costs are only the cost of food, you can offer consumers discounts and pay the system's service fee, while still clearing a profit on these customers of 45%, a rate seven to eight times higher than the profitability for your average customer. The 15 additional customers you served provide you with $95 in profit.

Take-Out Service

Things slow down during the mid-afternoon but start to pick up at around 4:00 p.m. again thanks to the system. Your kitchen is working at full capacity preparing take-out orders, because the system has made take-out orders simple for both you and your customers. If you weren't accepting take-out orders already, the system provides you with a completely new set of customers. If you were doing take-out, you now have even more orders. You think, with a smile, of another $175 dropping to your bottom-line.

Dinner

As 6:00 p.m. rolls around, your strategy changes again. In fact, it changes slightly depending on the day of week, or what convention or event is in town. Your strategy might entail special offers to improve your after-work time segment, to incite greater than $50 in food and drinks, to cater to business travelers or only to groups of four. You are happy because not only are all of your tables full, but most of the seats at those tables as well. Your strategy changes to increase your profitability. It changes because the system provides you with the tools to handle changing demand and staffing capacity. On your path to higher profitability, the capacity/demand management system is with you every step of the way.

What is claimed is:

1. A computer-based method for capacity/demand management in restaurant and other prepared-food service industries, comprising:

accepting from a first party transaction parameter values for composite resources, wherein each composite resource has associated therewith at least a service location, a service date, a service time and a transaction price parameter, via a computer device containing a first program with a first program routine programmed to accept transaction parameter values;

transmitting the accepted transaction parameter values through a computer-based communication from the first party's device to one or more computer devices upon which is stored a second program;

receiving the transmitted transaction parameter values into the second program with program routines programmed to receive (first routine), access (second routine) and store (third routine) transaction parameter values into one or more data stores stored in memory on one or more computer devices, said program configured to accept and said one or more data stores configured to contain transaction parameter values from at least two differentiable first parties;

storing the received transaction parameter values and information differentiating the first party, through use of the third program routine of the second program into the one or more data stores;

accepting from a second party a at least one user-selected search criterion, via computer device containing a third program with a first program routine programmed to accept search criteria;

transmitting the accepted search criteria through a computer-based communication from the second party's device to one or more computer devices upon which is stored the second program;

receiving the transmitted search criteria into the second program with a fourth program routine programmed to perform a comparison;

comparing received search criteria to the stored transaction parameter values for composite resources contained within the one or more data stores through the fourth program routine of the second program;

transmitting at least a portion of the transaction parameter values for at least one available composite resource related to the second party's search criteria through a computer-based communication from the computer device containing the fourth program routine of the second program performing the comparison to the second party's device;

receiving the transmission into the third program contained on the second party's device with a second program routine programmed to communicate the transmission to the second party;

communicating the transmission through the second program routine of the third program to the second party;

accepting from the second party a reservation request for at least one composite resource from the communicated transmission, via a computer device containing the third program with a third program routine programmed to accept reservation requests;

transmitting the reservation request through a computer-based communication from the second party's device to one or more computer devices containing the second program;

receiving the transmitted request into the second program with program routines programmed to evaluate the status of any requested resources to indicate whether they are available for reservation or not (fifth routine), and whether suitable composite resources with alternate transaction parameter values are available, said suitability determined by the program based on program instructions accessing decision rules entered by the program administrator, the first party or the second party (sixth routine), said program also able to determine an acceptable match between requested and available resources (seventh routine), said program also able to determine a reasonable counter-offer given the available composite resources, the reservation request and the results of any previous counter-offers (eighth routine), and, said program also able to determine appropriate transmissions for the acceptance, counter-offer or rejection of the reservation request (ninth routine);

performing the availability, suitability, counter-offer and transmission determinations;

transmitting based on the availability, suitability, counter-offer and transmission determinations at least one of a confirmation of the reservation request, a counter-offer to the reservation request and a rejection of the reservation request, through a computer-based communication from the computer device into the third program contained on the second party's device;

receiving the transmitted confirmation, counter-offer or rejection into the third program with program routines programmed to communicate the transmission to the second party (fourth routine), to offer for acceptance by the second party any counter-offered composite resources (fifth routine) and to iterate the above reservation request steps until a suitability match is successfully made (sixth routine) or the program (seventh routine) or the second user (eighth routine) determines that no suitable composite resource exists for reservation (ninth routine);

communicating the transmission through the third program to the second party (fourth routine of the third program);

offering for acceptance by the second party any counter-offered composite resources (fifth routine of the third program) and, if the offer is not accepted, iterating the above reservation request steps until a suitability match is successfully made (sixth routine) or the program (seventh routine) or the second user (eighth routine) determines that no suitable composite resource exists for reservation (ninth routine);

modifying through a tenth routine of the second program, in response to an acceptable match, at least one of the availability status of the composite resource and a measure of the remaining available capacity of the composite resource;

storing through an eleventh routine of the second program any modification to the availability status or measure in the one or more data stores;

storing through a twelfth routine of the second program information relating to the reservation, including information relating to the first and second parties, in the one or more data stores;

transmitting through a thirteenth routine of the second program one or more links to the information stored in the one or more data stores through a computer-based communication from the computer device into the first and third programs contained on the first (first program) and second (third program) party's devices;

receiving the transmitted links into the first and third programs containing program routines (second and ninth, respectively) programmed to communicate the links;

communicating the transmission through the second program routine of the first program and ninth program routine of the third program to the first (first program) and second (third program) parties;

wherein the function of the first communication is to: 1) increase demand through more favorable transaction parameter values to potential users of the composite resources; 2) decrease demand through less favorable transaction parameter values to potential users of the composite resources; 3) increase capacity through more favorable transaction parameter values to service provider resources; 4) reduce capacity through less favorable transaction parameter values to service provider resources; 5) increase capacity through changing the composition of resources within the composite resource; 6) reduce capacity through changing the composition of resources within the composite resource; 7) obtain employment or independent contractor opportunities; or, 8) implement two or more of the above functions at the same time;

wherein the at least one composite resource is employed in prepared food service industries; and, wherein the at least one service date and service time is a date and time point or range measure indicating a present or future first date and time when the service is available.

2. The method of claim 1:

wherein transaction parameter values for composite resources are determined using at least one yield-management method.

3. The method of claim 1:

wherein transaction parameter values for composite resources are determined by at least one resource network manager.

4. The method of claim 1:

wherein the transmitting of at least a portion of the transaction parameter values for at least one available composite resource to a second party employs a transaction invitation management method.

5. The method of claim 1:

wherein the transmitting of at least a portion of the transaction parameter values for at least one available composite resource to a second party employs a list bid price management method.

6. A computer based capacity/demand management system in restaurant and other prepared-food service industries, comprising:

means for accepting from a first party transaction parameter values for composite resources, wherein each composite resource has associated therewith at least a service location, a service date, a service time and a transaction price parameter, via a computer device containing a first program with a first program routine programmed to accept transaction parameter values;

means for transmitting the accepted transaction parameter values through a computer-based communication from the first party's device to one or more computer devices upon which is stored a program;

means for receiving the transmitted transaction parameter values into the second program with program routines programmed to receive (first routine), access (second routine) and store (third routine) transaction parameter values into one or more data stores stored in memory on one or more computer devices, said program configured to accept and said one or more data stores configured to contain transaction parameter values from at least two differentiable first parties;

means for storing the received transaction parameter values through use of the third program routine of the second program into the one or more data stores;

means for accepting from a second party at least one user-selected search criterion, via a computer device containing a third program with a first program routine programmed to accept search criteria;

means for transmitting the accepted search criteria through a computer-based communication from the second party's device to one or more computer devices upon which is stored the second program;

means for receiving the transmitted search criteria into the second program with a fourth program routine programmed to perform a comparison;

means for comparing the received search criteria to the stored transaction parameter values for composite resources contained within the one or more data stores through the fourth program routine of the second program;

means for transmitting at least a portion of the transaction parameter values for at least one available composite resource related to the second party's search criteria through a computer-based communication from the computer device containing the fourth program routine of the second program performing the comparison to the second party's device;

means for receiving the transmission into the third program contained on the second party's device with a second program routine programmed to communicate the transmission to the second party;

means for communicating the transmission through the second program routine of the third program to the second party;

means for accepting from the second party a reservation request for at least one composite resource from the communicated transmission, via a computer device containing the third program with a third program routine programmed to accept reservation requests;

means for transmitting the reservation request through a computer-based communication from the second party's device to one or more computer devices containing the second program;

means for receiving the transmitted request into the second program with program routines programmed to evaluate the status of any requested resources to indicate whether they are available for reservation or not (fifth routine), and whether suitable composite resources with alternate transaction parameter values are available, said suitability determined by the program based on program instructions accessing decision rules entered by the program administrator, the first party or the second party (sixth routine), said program also able to determine an acceptable match between requested and available resources (seventh routine), said program also able to determine a reasonable counter-offer given the available composite resources, the reservation request and the results of any previous counter-offers (eighth routine), and, said program also able to determine appropriate transmissions for the acceptance, counter-offer or rejection of the reservation request (ninth routine);

means for performing the availability, suitability, counter-offer and transmission determinations;

means for transmitting based on the availability, suitability, counter-offer and transmission determinations at least one of a confirmation of the reservation request, a counter-offer to the reservation request and a rejection of the reservation request, through a computer-based communication from the computer device into the third program contained on the second party's device;

means for receiving the transmitted confirmation, counter-offer or rejection into the third program with program routines programmed to communicate the transmission to the second party (fourth routine), to offer for acceptance by the second party any counter-offered composite resources (fifth routine) and to iterate the above reservation request steps until a suitability match is successfully made (sixth routine) or the program (seventh routine) or the second user (eighth routine) determines that no suitable composite resource exists for reservation (ninth routine);

means for communicating the transmission through the third program to the second party (fourth routine of the third program);

means for offering for acceptance by the second party any counter-offered composite resources (fifth routine of the third program) and, if the offer is not accepted, iterating the above reservation request steps until a suitability match is successfully made (sixth routine) or the program (seventh routine) or the second user (eighth routine) determines that no suitable composite resource exists for reservation (ninth routine);

means for modifying through a tenth routine of the second program, in response to an acceptable match, at least one of the availability status of the composite resource and a measure of the available capacity of the composite resource;

means for storing through an eleventh routine of the second program any modification to the availability status or measure in the one or more data stores;

means for storing through an twelfth routine of the second program information relating to the reservation, including information relating to the first and second parties, in the one or more data stores;

means for transmitting through a thirteenth routine of the second program one or more links to the information stored in the one or more data stores through a computer-based communication from the computer device into the first and third programs contained on the first (first program) and second (third program) party's devices;

means for receiving the transmitted links into the first and third programs containing program routines (second and ninth, respectively) programmed to communicate the links;

means for communicating the transmission through the second program routine of the first program and ninth program routine of the third program to the first (first program) and second (third program) parties;

wherein the function of the first communication is to: 1) increase demand through more favorable transaction parameter values to potential users of the composite resources; 2) decrease demand through less favorable transaction parameter values to potential users of the composite resources; 3) increase capacity through more favorable transaction parameter values to service provider resources; 4) reduce capacity through less favorable transaction parameter values to service provider resources; 5) increase capacity through changing the composition of resources within the composite resource; 6) reduce capacity through changing the composition of resources within the composite resource; 7) obtain employment or independent contractor opportunities; or, 8) implement two or more of the above functions at the same time;

wherein the at least one composite resource is employed in prepared food service industries; and, wherein the at least one service date and service time is a date and time point or range measure indicating a present or future first date and time when the service is available.

7. The system of claim 6:

wherein transaction parameter values for composite resources are determined using at least one yield-management method.

8. The system of claim 6:
wherein transaction parameter values for composite resources are determined by at least one resource network manager.

9. The system of claim 6:
wherein the transmitting of at least a portion of the transaction parameter values for at least one available composite resource to a second party employs a transaction invitation management method.

10. The system of claim 6:
wherein the transmitting of at least a portion of the transaction parameter values for at least one available composite resource to a second party employs a list bid price management method.

11. A capacity/demand management system comprising:
a first storage device storing a first program;
at least one processor connected to the first storage device and controlled by the first program, the at least one processor operative with the program to receive from a first party transmitted transaction parameter values for composite resources in prepared-food service industries and to access and store them into one or more data stores said program configured to accept and said one or more data stores configured to contain transaction parameter values from at least two differentiable first parties, to receive from a second party transmitted search criteria, to compare the received search criteria to the stored transaction parameter values for composite resources contained within the one or more data stores, to transmit at least a portion of the transaction parameter values for at least one available composite resource related to the second party's search criteria to the second party's device, to receive from the second party transmitted reservation requests relating to the previously-transmitted transaction parameter values, to evaluate the status of any requested resources to indicate whether they are available for reservation or not, and whether suitable composite resources with alternate transaction parameter values are available, to evaluate the suitability of alternate composite resources based on program instructions accessing decision rules entered by the program administrator, the first party or the second party, to determine an acceptable alternate match between requested and available resources, to determine a reasonable counter-offer given the available composite resources, the reservation request and the results of any previous counter-offers, to determine appropriate transmissions for the acceptance, counter-offer or rejection of the reservation request, to transmit to the second party based on the availability, suitability, counter-offer and transmission determinations at least one of a confirmation of the reservation request, a counter-offer to the reservation request and a rejection of the reservation request, to iterate the above reservation request steps until a suitability match is successfully made or the program or the second user determines that no suitable composite resource exists for reservation, to modify, in response to an acceptable match, at least one of the availability status of the composite resource and a measure of the remaining available capacity of the composite resource, to store any modification to the availability status or measure in the one or more data stores, to store information relating to the reservation, including information relating to the first and second parties, in the one or more data stores, and, to transmit one or more links to the stored information to the first and second party's devices;
one or more second storage devices storing a second program;
at least one processor connected to the one or more storage devices and controlled by the second program, the at least one processor operative with the program to accept from a first party transaction parameter values for composite resources, wherein each composite resource has associated therewith at least a service location, a service date, a service time and a transaction price parameter, to transmit the accepted transaction parameter values to the first program, to receive transmitted links relating to the transaction parameter values, and to communicate the information contained in the transmitted links to the device user;
a third storage device storing a third program; and
at least one processor connected to the third storage device and controlled by the third program, the at least one processor operative with the program to accept at least one user-selected search criterion relating to transaction parameter values for composite resources, to transmit the accepted search criteria to the first program, to receive a transmission containing at least a portion of the transaction parameter values for at least one available composite resource related to the search criteria, to communicate the transmission to the device user, to accept a reservation request for at least one composite resource from the communicated transmission, to transmit the reservation request to the first program, to receive a transmission containing a confirmation, counter-offer or rejection, to communicate the transmission to the device user, to offer for acceptance by the device user any counter-offered composite resources and to iterate the above reservation request steps until a suitability match is successfully made or the program or the user determines that no suitable composite resource exists for reservation, to receive transmitted links relating to the transaction parameter values, and to communicate the information contained in the transmitted links to the device user;
wherein the function of the first transmission by the first party from the second program is to: 1) increase demand through more favorable transaction parameter values to potential users of the composite resources; 2) decrease demand through less favorable transaction parameter values to potential users of the composite resources; 3) increase capacity through more favorable transaction parameter values to service provider resources; 4) reduce capacity through less favorable transaction parameter values to service provider resources; 5) increase capacity through changing the composition of resources within the composite resource; 6) reduce capacity through changing the composition of resources within the composite resource; 7) obtain employment or independent contractor opportunities; or, 8) implement two or more of the above functions at the same time;
wherein the at least one composite resource is employed in prepared food service industries; and,
wherein the at least one service date and service time is a date and time point or range measure indicating a present or future first date and time when the service is available.

12. The system of claim 11:

wherein transaction parameter values for composite resources are determined using at least one yield-management method.

13. The system of claim 11:
wherein transaction parameter values for composite resources are determined by at least one resource network manager.

14. The system of claim 11:
wherein the transmitting of at least a portion of the transaction parameter values for at least one available composite resource to a second party employs a transaction invitation management method.

15. The system of claim 11:
wherein the transmitting of at least a portion of the transaction parameter values for at least one available composite resource a second party employs a list bid price management method.

16. One or more non-transitory computer-readable media containing program instructions for controlling a computer to perform a method comprising:
 accepting from a first party transaction parameter values related to individual resources and associated composite resources, wherein the associated composite resources each include a collection of at least two of the individual resources, wherein the associated composite resources each have associated therewith at least a service location, a service date, a service time and a transaction price parameter, and wherein at least one associated composite resource is employed in prepared-food service industries;
 storing the data related to the individual resources and the associated composite resources;
 constructing internal data structures which link each of the individual resources to associated composite resources and link each of the composite resources to associated individual resources, and which link each composite resource to the first party;
 indicating when a capacity of a composite resource exceeds a demand for the composite resource;
 modifying, in response to the indication a transaction price parameter for the composite resource;
 accepting from a second party, via a computer, at least one user-selected search criterion;
 comparing the at least one user-selected search criterion accepted to the accepted transaction parameter values for composite resources;
 communicating to the second party at least a portion of the transaction parameter values for at least one composite resource related to the potential user's at least one user-selected search criterion;
 receiving a responding communication from the second party attempting to reserve at least one composite resource with specified transaction parameter values;
 evaluating the status of any requested resources to indicate whether they are available for reservation or not, and whether suitable composite resources with alternate transaction parameter values are available;
 evaluating the suitability of alternate composite resources based on program instructions accessing decision rules entered by the program administrator, the first party or the second party, to determine an acceptable alternate match between requested and available resources;
 determining a reasonable counter-offer given the available composite resources, the reservation request and the results of any previous counter-offers;
 determining appropriate transmissions for the acceptance, counter-offer or rejection of the reservation request
 communicating to the second party based on the availability, suitability, counter-offer and transmission determinations at least one of a confirmation of the reservation request, a counter-offer to the reservation request and a rejection of the reservation request;
 iterating the above reservation request steps until a suitability match is successfully made or the program or the second user determines that no suitable composite resource exists for reservation;
 modifying, in response to a successful match, at least one of the availability status of the composite resource and a measure of the remaining available capacity of the composite resource;
 storing any modification to the availability status or measure in the one or more data stores;
 storing information relating to the reservation, including information relating to the first and second parties, in the one or more data stores, and,
 transmitting one or more links to the stored information to the first and second party's devices;
 wherein the function of the first communication is to: 1) increase demand through more favorable transaction parameter values to potential users of the composite resources; 2) decrease demand through less favorable transaction parameter values to potential users of the composite resources; 3) increase capacity through more favorable transaction parameter values to service provider resources; 4) reduce capacity through less favorable transaction parameter values to service provider resources; 5) increase capacity through changing the composition of resources within the composite resource; 6) reduce capacity through changing the composition of resources within the composite resource; 7) obtain employment or independent contractor opportunities; or, 8) implement two or more of the above functions at the same time;
 wherein the at least one composite resource is employed in prepared food service industries; and,
 wherein the at least one service date and service time is a date and time point or range measure indicating a present or future first date and time when the service is available.

17. The medium of claim 16:
wherein transaction parameter values for composite resources are determined using at least one yield-management method.

18. The medium of claim 16:
wherein transaction parameter values for composite resources are determined by at least one resource network manager.

19. The medium of claim 16:
wherein the transmitting of at least a portion of the transaction parameter values for at least one available composite resource to a second party employs a transaction invitation management method.

20. The medium of claim 16:
wherein the transmitting of at least a portion of the transaction parameter values for at least one available composite resource to a second party employs a list bid price management method.

21. A computer-based method for producing composite resource transactions, the method comprising:
 accepting from a first party transaction parameter values for composite resources in prepared-food service industries, wherein each composite resource has associated therewith at least a service location, a service date, a service time and a transaction price parameter via a computer device containing a first program with a first program routine programmed to accept transaction parameter values;

transmitting the accepted transaction parameter values through a computer-based communication from the first party's device to one or more computer devices upon which is stored a second program;

receiving the transmitted transaction parameter values into the second program with program routines programmed to receive (first routine), access (second routine) and store (third routine) transaction parameter values into one or more data stores stored in memory on one or more computer devices, said program configured to accept and said one or more data stores configured to contain transaction parameter values from at least two differentiable first parties;

storing the received transaction parameter values through use of the third program routine of the second program into the one or more data stores;

accepting from a second party at least one user-selected search criterion, via a computer device containing a third program with a first program routine programmed to accept search criteria;

transmitting the accepted search criteria through a computer-based communication from the second party's device to one or more computer devices upon which is stored the second program;

receiving the transmitted search criteria into the second program with a fourth program routine programmed to perform a comparison;

comparing the received search criteria to the stored transaction parameter values for composite resources contained within the one or more data stores through the fourth program routine of the second program;

transmitting at least a portion of the transaction parameter values for at least one available composite resource related to the second party's search criteria through a computer-based communication from the computer device containing the fourth program routine of the second program performing the comparison to the second party's device;

receiving the transmission into the third program contained on the second party's device with a second program routine programmed to communicate the transmission to the second party;

communicating the transmission through the second program routine of the third program to the second party;

accepting from the second party a reservation request for at least one composite resource from the communicated transmission, via a computer device containing the third program with a third program routine programmed to accept reservation requests;

transmitting the reservation request through a computer-based communication from the second party's device to one or more computer devices containing the second program;

receiving the transmitted request into the second program with program routines programmed to evaluate the status of any requested resources to indicate whether they are available for reservation or not (fifth routine), and whether suitable composite resources with alternate transaction parameter values are available, said suitability determined by the program based on program instructions accessing decision rules entered by the program administrator, the first party or the second party (sixth routine), said program also able to determine an acceptable match between requested and available resources (seventh routine), said program also able to determine a reasonable counter-offer given the available composite resources, the reservation request and the results of any previous counter-offers (eighth routine), and, said program also able to determine appropriate transmissions for the acceptance, counter-offer or rejection of the reservation request (ninth routine);

performing the availability, suitability, counter-offer and transmission determinations;

transmitting based on the availability, suitability, counter-offer and transmission determinations at least one of a confirmation of the reservation request, a counter-offer to the reservation request and a rejection of the reservation request, through a computer-based communication from the computer device into the third program contained on the second party's device;

receiving the transmitted confirmation, counter-offer or rejection into the third program with program routines programmed to communicate the transmission to the second party (fourth routine), to offer for acceptance by the second party any counter-offered composite resources (fifth routine) and to iterate the above reservation request steps until a suitability match is successfully made (sixth routine) or the program (seventh routine) or the second user (eighth routine) determines that no suitable composite resource exists for reservation (ninth routine);

communicating the transmission through this third program to the second party (fourth routine of the third program);

offering for acceptance by the second party any counter-offered composite resources (fifth routine of the third program) and, if the offer is not accepted, iterating the above reservation request steps until a suitability match is successfully made (sixth routine) or the program (seventh routine) or the second user (eighth routine) determines that no suitable composite resource exists for reservation (ninth routine);

modifying through a tenth routine of the second program, in response to an acceptable match, at least one of the availability status of the composite resource and a measure of the remaining available capacity of the composite resource;

storing through an eleventh routine of the second program any modification to the availability status or measure in the one or more data stores;

storing through a twelfth routine of the second program information relating to the reservation, including information relating to the first and second parties, in the one or more data stores;

transmitting through a thirteenth routine of the second program one or more links to the information stored in the one or more data stores through a computer-based communication from the computer device into a program contained on the first (first program) and second (third program) party's devices;

receiving the transmitted links into the first and third programs containing program routines (second and ninth, respectively) programmed to communicate the links;

communicating the transmission through the second program routine of the first program and ninth program routine of the third program to the first (first program) and second (third program) parties, wherein the function of the first communication is to: 1) increase demand through more favorable transaction parameter values to potential users of the composite resources; 2) decrease demand through less favorable transaction parameter values to potential users of the composite resources; 3) increase capacity through more favorable transaction parameter values to service provider resources; 4) reduce capacity through less favorable transaction parameter values to service provider resources; 5) increase capacity through changing the composition of resources within the composite resource; 6) reduce capacity through changing the composition of resources within the composite resource; 7) obtain employment or independent contractor opportunities; or, 8) implement two or more of the above functions at the same time;

wherein the at least one composite resource is employed in prepared food service industries; and, wherein the at least one service date and service time is a date and time point or range measure indicating a present or future first date and time when the service is available.

22. The method of claim 21:

wherein transaction parameter values for composite resources are determined using at least one yield-management method.

23. The method of claim 21:

wherein transaction parameter values for composite resources are determined by at least one resource network manager.

24. The method of claim 21:

wherein the transmitting of at least a portion of the transaction parameter values for at least one available composite resource to a second party employs a transaction invitation management method.

25. The method of claim 21:

wherein the transmitting of at least a portion of the transaction parameter values for at least one available composite resource to a second party employs a list bid price management method.

26. A computer-based transaction method, comprising:

accepting from a first party transaction parameter values for composite resources, wherein each composite resource has associated therewith at least a service location, a service date, a service time and a transaction price parameter, via a computer device containing a program with a first program routine programmed to accept transaction parameter values;

transmitting the accepted transaction parameter values through a computer-based communication from the first party's device to one or more computer devices upon which is stored a second program;

receiving the transmitted transaction parameter values into the second program with program routines programmed to receive (first routine), access (second routine) and store (third routine) transaction parameter values into one or more data stores stored in memory on one or more computer devices, said program configured to accept and said one or more data stores configured to contain transaction parameter values from at least two differentiable first parties;

storing the received transaction parameter values and information differentiating the first party, through use of the third program routine of the second program into the one or more data stores;

accepting from a second party at least one user-selected search criterion, via computer device containing a third program with a first program routine programmed to accept search criteria;

transmitting the accepted search criteria through a computer-based communication from the second party's device to one or more computer devices upon which is stored the second program;

receiving the transmitted search criteria into the second program with a fourth program routine programmed to perform a comparison;

comparing received search criteria to the stored transaction parameter values for composite resources contained within the one or more data stores through the fourth program routine of the second program;

transmitting at least a portion of the transaction parameter values for at least one available composite resource related to the second party's search criteria through a computer-based communication from the computer device containing the fourth program routine of the second program performing the comparison to the second party's device;

receiving the transmission into the third program contained on the second party's device with a second program routine programmed to communicate the transmission to the second party;

communicating the transmission through the second program routine of the third program to the second party;

accepting from the second party a reservation request for at least one composite resource from the communicated transmission, via a computer device containing the third program with a third program routine programmed to accept reservation requests;

transmitting the reservation request through a computer-based communication from the second party's device to one or more computer devices containing the second program;

receiving the transmitted request into the second program with program routines programmed to evaluate the status of any requested resources to indicate whether they are available for reservation or not (fifth routine), and whether suitable composite resources with alternate transaction parameter values are available, said suitability determined by the program based on program instructions accessing decision rules entered by the program administrator, the first party or the second party (sixth routine), said program also able to determine an acceptable match between requested and available resources (seventh routine), said program also able to determine a reasonable counter-offer given the available composite resources, the reservation request and the results of any previous counter-offers (eighth routine), and, said program also able to determine appropriate transmissions for the acceptance, counter-offer or rejection of the reservation request (ninth routine);

performing the availability, suitability, counter-offer and transmission determinations;

transmitting based on the availability, suitability, counter-offer and transmission determinations at least one of a confirmation of the reservation request, a counter-offer to the reservation request and a rejection of the reservation request, through a computer-based communication from the computer device into the third program contained on the second party's device;

receiving the transmitted confirmation, counter-offer or rejection into the third program with program routines programmed to communicate the transmission to the second party (fourth routine), to offer for acceptance by the second party any counter-offered composite resources (fifth routine) and to iterate the above reservation request steps until a suitability match is successfully made (sixth routine) or the program (seventh routine) or the second user (eighth routine) determines that no suitable composite resource exists for reservation (ninth routine);
communicating the transmission through the third program to the second party (fourth routine of the third program);
offering for acceptance by the second party any counter-offered composite resources (fifth routine of the third program) and, if the offer is not accepted, iterating the above reservation request steps until a suitability match is successfully made (sixth routine) or the program (seventh routine) or the second user (eighth routine) determines that no suitable composite resource exists for reservation (ninth routine);
modifying through a tenth routine of the second program, in response to an acceptable match, at least one of the availability status of the composite resource and a measure of the remaining available capacity of the composite resource;
storing through a eleventh routine of the second program any modification to the availability status or measure in the one or more data stores;
storing through a twelfth routine of the second program information relating to the reservation, including information relating to the first and second parties, in the one or more data stores;
transmitting through a thirteenth routine of the second program one or more links to the information stored in the one or more data stores through a computer-based communication from the computer device into the first and third programs contained on the first (first program) and second (third program) party's devices;
receiving the transmitted links into the first and third programs containing program routines (second and ninth, respectively) programmed to communicate the links;
communicating the transmission through the second program routine of the first program and ninth program routine of the third program to the first (first program) and second (third program) parties;
wherein the function of the first communication is to: 1) increase demand through more favorable transaction parameter values to potential users of the composite resources; 2) decrease demand through less favorable transaction parameter values to potential users of the composite resources; 3) increase capacity through more favorable transaction parameter values to service provider resources; 4) reduce capacity through less favorable transaction parameter values to service provider resources; 5) increase capacity through changing the composition of resources within the composite resource; 6) reduce capacity through changing the composition of resources within the composite resource; 7) obtain employment or independent contractor opportunities; or, 8) implement two or more of the above functions at the same time;
wherein the at least one composite resource is employed in prepared food service industries; and,
wherein the at least one service date and service time is a date and time point or range measure indicating a present or future first date and time when the service is available.

27. A computer based system for creating a transaction, comprising:
means for accepting from a first party transaction parameter values for composite resources, wherein each composite resource has associated therewith at least a service location, a service date, a service time and a transaction price parameter, via a computer device containing a first program with a first program routine programmed to accept transaction parameter values;
means for transmitting the accepted transaction parameter values through a computer-based communication from the first party's device to one or more computer devices upon which is stored a second program;
means for receiving the transmitted transaction parameter values into the second program with program routines programmed to receive (first routine), access (second routine) and store (third routine) transaction parameter values into one or more data stores stored in memory on one or more computer devices, said program configured to accept and said one or more data stores configured to contain transaction parameter values from at least two differentiable first parties;
means for storing the received transaction parameter values through use of the third program routine of the second program into the one or more data stores;
means for accepting from a second party at least one user-selected search criterion, via a computer device containing a third program with a first program routine programmed to accept search criteria;
means for transmitting the accepted search criteria through a computer-based communication from the second party's device to one or more computer devices upon which is stored the second program;
means for receiving the transmitted search criteria into the second program with a fourth program routine programmed to perform a comparison;
means for comparing the received search criteria to the stored transaction parameter values for composite resources contained within the one or more data stores through the fourth program routine of the second program;
means for transmitting at least a portion of the transaction parameter values for at least one available composite resource related to the second party's search criteria through a computer-based communication from the computer device containing the fourth program routine of the second program performing the comparison to the second party's device;
means for receiving the transmission into the third program contained on the second party's device with a second program routine programmed to communicate the transmission to the second party;
means for communicating the transmission through the second program routine of the third program to the second party;
means for accepting from the second party a reservation request for at least one composite resource from the communicated transmission, via a computer device containing the third program with a third program routine programmed to accept reservation requests;
means for transmitting the reservation request through a computer-based communication from the second party's device to one or more computer devices containing the second program;
means for receiving the transmitted request into the second program with program routines programmed to evaluate the status of any requested resources to indicate whether they are available for reservation or not (fifth routine), and whether suitable composite resources with alternate transaction parameter values are available, said suitability determined by the program based on program instructions accessing decision rules entered by the program administrator, the first party or the second party (sixth routine), said program also able to determine an acceptable match between requested and available resources (seventh routine), said program also able to determine a reasonable counter-offer given the available composite resources, the reservation request and the results of any previous counter-offers (eighth routine), and, said program also able to determine appropriate transmissions for the acceptance, counter-offer or rejection of the reservation request (ninth routine);

means for performing the availability, suitability, counter-offer and transmission determinations;

means for transmitting based on the availability, suitability, counter-offer and transmission determinations at least one of a confirmation of the reservation request, a counter-offer to the reservation request and a rejection of the reservation request, through a computer-based communication from the computer device into the third program contained on the second party's device;

means for receiving the transmitted confirmation, counter-offer or rejection into the third program with program routines programmed to communicate the transmission to the second party (fourth routine), to offer for acceptance by the second party any counter-offered composite resources (fifth routine) and to iterate the above reservation request steps until a suitability match is successfully made (sixth routine) or the program (seventh routine) or the second user (eighth routine) determines that no suitable composite resource exists for reservation (ninth routine);

means for modifying through a tenth routine of the second program, in response to an acceptable match, at least one of the availability status of the composite resource and a measure of the available capacity of the composite resource;

means for storing through an eleventh routine of the second program any modification to the availability status or measure in the one or more data stores;

means for storing through an twelfth routine of the second program information relating to the reservation, including information relating to the first and second parties, in the one or more data stores;

means for transmitting through an thirteenth routine of the second program one or more links to the information stored in the one or more data stores through a computer-based communication from the computer device into the first and third programs contained on the first (first program) and second (third program) party's devices;

means for receiving the transmitted links into the first and third programs containing program routines (second and ninth, respectively) programmed to communicate the links;

means for communicating the transmission through the second program routine of the first program and ninth program routine of the third program to the first (first program) and second (third program) parties;

wherein the function of the first communication is to: 1) increase demand through more favorable transaction parameter values to potential users of the composite resources; 2) decrease demand through less favorable transaction parameter values to potential users of the composite resources; 3) increase capacity through more favorable transaction parameter values to service provider resources; 4) reduce capacity through less favorable transaction parameter values to service provider resources; 5) increase capacity through changing the composition of resources within the composite resource; 6) reduce capacity through changing the composition of resources within the composite resource; 7) obtain employment or independent contractor opportunities; or, 8) implement two or more of the above functions at the same time;

wherein the at least one composite resource is employed in prepared food service industries; and, wherein the at least one service date and service time is a date and time point or range measure indicating a present or future first date and time when the service is available.

28. A transaction system comprising:

a first storage device storing a first program;

at least one processor connected to the first storage device and controlled by the first program, the at least one processor operative with the program to receive from a first party transmitted transaction parameter values for composite resources in prepared-food service industries and to access and store them into one or more data stores said program configured to accept and said one or more data stores configured to contain transaction parameter values from at least two differentiable first parties, to receive from a second party transmitted search criteria, to compare the received search criteria to the stored transaction parameter values for composite resources contained within the one or more data stores, to transmit at least a portion of the transaction parameter values for at least one available composite resource related to the second party's search criteria to the second party's device, to receive from the second party transmitted reservation requests relating to the previously-transmitted transaction parameter values, to evaluate the status of any requested resources to indicate whether they are available for reservation or not, and whether suitable composite resources with alternate transaction parameter values are available, to evaluate the suitability of alternate composite resources based on program instructions accessing decision rules entered by the program administrator, the first party or the second party, to determine an acceptable alternate match between requested and available resources, to determine a reasonable counter-offer given the available composite resources, the reservation request and the results of any previous counter-offers, to determine appropriate transmissions for the acceptance, counter-offer or rejection of the reservation request, to transmit to the second party based on the availability, suitability, counter-offer and transmission determinations at least one of a confirmation of the reservation request, a counter-offer to the reservation request and a rejection of the reservation request, to iterate the above reservation request steps until a suitability match is successfully made or the program or the second user determines that no suitable composite resource exists for reservation, to modify, in response to an acceptable match, at least one of the availability status of the composite resource and a measure of the remaining available capacity of the composite resource, to store any modification to the availability status or measure in the one or more data stores, to store information relating to the reservation, including information relating to the first and second parties, in the one or more data stores, and, to transmit one or more links to the stored information to the first and second party's devices;

one or more second storage devices storing a second program;

at least one processor connected to the one or more storage devices and controlled by the second program, the at least one processor operative with the program to accept from a first party transaction parameter values for composite resources, wherein each composite resource has associated therewith at least a service location, a service date, a service time and a transaction price parameter, to transmit the accepted transaction parameter values to the first program, to receive transmitted links relating to the transaction parameter values, and to communicate the information contained in the transmitted links to the device user;

a third storage device storing a third program; and at least one processor connected to the third storage device and controlled by the third program, the at least one processor operative with the program to accept at least one user-selected search criterion relating to transaction parameter values for composite resources, to transmit the accepted search criteria to the first program, to receive a transmission containing at least a portion of the transaction parameter values for at least one available composite resource related to the search criteria, to communicate the transmission to the device user, to accept a reservation request for at least one composite resource from the communicated transmission, to transmit the reservation request to the first program, to receive a transmission containing a confirmation, counter-offer or rejection, to communicate the transmission to the device user, to offer for acceptance by the device user any counter-offered composite resources and to iterate the above reservation request steps until a suitability match is successfully made or the program or the user determines that no suitable composite resource exists for reservation, to receive transmitted links relating to the transaction parameter values, and to communicate the information contained in the transmitted links to the device user;

wherein the function of the first transmission by the first party from the second program is to: 1) increase demand through more favorable transaction parameter values to potential users of the composite resources; 2) decrease demand through less favorable transaction parameter values to potential users of the composite resources; 3) increase capacity through more favorable transaction parameter values to service provider resources; 4) reduce capacity through less favorable transaction parameter values to service provider resources; 5) increase capacity through changing the composition of resources within the composite resource; 6) reduce capacity through changing the composition of resources within the composite resource; 7) obtain employment or independent contractor opportunities; or, 8) implement two or more of the above functions at the same time;

wherein the at least one composite resource is employed in prepared food service industries; and, wherein the at least one service date and service time is a date and time point or range measure indicating a present or future first date and time when the service is available.

29. One or more non-transitory computer-readable media containing program instructions for controlling a computer to perform a transaction method comprising:

accepting from a first party transaction parameter values related to individual resources and associated composite resources, wherein the associated composite resources each include a collection of at least two of the individual resources, wherein the associated composite resources each have associated therewith at least a service location, a service date, a service time and a transaction price parameter and wherein at least one composite resource is employed in prepared-food service industries;

storing the data related to the individual resources and the associated composite resources;

constructing internal data structures which link each of the individual resources to their associated composite resources and link each of the composite resources to their associated individual resources, and which link each composite resource to the first party; and indicating when a capacity of a composite resource exceeds a demand for the composite resource;

modifying, in response to the indication a transaction price parameter for the composite resource;

accepting from a second party, via a computer, at least one user-selected search criterion;

comparing the at least one user-selected search criterion accepted to the accepted transaction parameter values for composite resources;

communicating to the second party at least a portion of the transaction parameter values for at least one composite resource related to the potential user's at least one user-selected search criterion;

receiving a responding communication from the second party attempting to reserve at least one composite resource with specified transaction parameter values;

evaluating the status of any requested resources to indicate whether they are available for reservation or not, and whether suitable composite resources with alternate transaction parameter values are available;

evaluating the suitability of alternate composite resources based on program instructions accessing decision rules entered by the program administrator, the first party or the second party, to determine an acceptable alternate match between requested and available resources;

determining a reasonable counter-offer given the available composite resources, the reservation request and the results of any previous counter-offers;

determining appropriate transmissions for the acceptance, counter-offer or rejection of the reservation request communicating to the second party based on the availability, suitability, counter-offer and transmission determinations at least one of a confirmation of the reservation request, a counter-offer to the reservation request and a rejection of the reservation request;

iterating the above reservation request steps until a suitability match is successfully made or the program or the second user determines that no suitable composite resource exists for reservation;

modifying, in response to a successful match, at least one of the availability status of the composite resource and a measure of the remaining available capacity of the composite resource;

storing any modification to the availability status or measure in the one or more data stores;

storing information relating to the reservation, including information relating to the first and second parties, in the one or more data stores, and, transmitting one or more links to the stored information to the first and second party's devices;

wherein the function of the first communication is to: 1) increase demand through more favorable transaction parameter values to potential users of the composite resources; 2) decrease demand through less favorable transaction parameter values to potential users of the composite resources; 3) increase capacity through more favorable transaction parameter values to service provider resources; 4) reduce capacity through less favorable transaction parameter values to service provider resources; 5) increase capacity through changing the composition of resources within the composite resource; 6) reduce capacity through changing the composition of resources within the composite resource; 7) obtain employment or independent contractor opportunities; or, 8) implement two or more of the above functions at the same time;

wherein the at least one composite resource is employed in prepared food service industries; and, wherein the at least one service date and service time is a date and time point or range measure indicating a present or future first date and time when the service is available.

30. A computer-based method for producing transactions, the method comprising:

accepting from a first party transaction parameter values for composite resources in prepared food service industries, wherein each composite resource has associated therewith at least a service location, a service date, a service time and a transaction price parameter, via a computer device containing a first program with a first program routine programmed to accept transaction parameter values;

transmitting the accepted transaction parameter values through a computer-based communication from the first party's device to one or more computer devices upon which is stored a second program;

receiving the transmitted transaction parameter values into the second program with program routines programmed to receive (first routine), access (second routine) and store (third routine) transaction parameter values into one or more data stores stored in memory on one or more computer devices, said program configured to accept and said one or more data stores configured to contain transaction parameter values from at least two differentiable first parties;

storing the received transaction parameter values through use of the third program routine of the second program into the one or more data stores;

accepting from a second party at least one user-selected search criterion, via a computer device containing a third program with a first program routine programmed to accept search criteria;

transmitting the accepted search criteria through a computer-based communication from the second party's device to one or more computer devices upon which is stored the second program;

receiving the transmitted search criteria into the second program with a fourth program routine programmed to perform a comparison;

comparing the received search criteria to the stored transaction parameter values for composite resources contained within the one or more data stores through the fourth program routine of the second program;

transmitting at least a portion of the transaction parameter values for at least one available composite resource related to the second party's search criteria through a computer-based communication from the computer device containing the fourth program routine of the second program performing the comparison to the second party's device;

receiving the transmission into the third program contained on the second party's device with a second program routine programmed to communicate the transmission to the second party;

communicating the transmission through the second program routine of the third program to the second party;

accepting from the second party a reservation request for at least one composite resource from the communicated transmission, via a computer device containing the third program with a third program routine programmed to accept reservation requests;

transmitting the reservation request through a computer-based communication from the second party's device to one or more computer devices containing the second program;

receiving the transmitted request into the second program with program routines programmed to evaluate the status of any requested resources to indicate whether they are available for reservation or not (fifth routine), and whether suitable composite resources with alternate transaction parameter values are available, said suitability determined by the program based on program instructions accessing decision rules entered by the program administrator, the first party or the second party (sixth routine), said program also able to determine an acceptable match between requested and available resources (seventh routine), said program also able to determine a reasonable counter-offer given the available composite resources, the reservation request and the results of any previous counter-offers (eighth routine), and, said program also able to determine appropriate transmissions for the acceptance, counter-offer or rejection of the reservation request (ninth routine);

performing the availability, suitability, counter-offer and transmission determinations;

transmitting based on the availability, suitability, counter-offer and transmission determinations at least one of a confirmation of the reservation request, a counter-offer to the reservation request and a rejection of the reservation request, through a computer-based communication from the computer device into the third program contained on the second party's device;

receiving the transmitted confirmation, counter-offer or rejection into the third program with program routines programmed to communicate the transmission to the second party (fourth routine), to offer for acceptance by the second party any counter-offered composite resources (fifth routine) and to iterate the above reservation request steps until a suitability match is successfully made (sixth routine) or the program (seventh routine) or the second user (eighth routine) determines that no suitable composite resource exists for reservation (ninth routine);

communicating the transmission through the third program to the second party (fourth routine of the third program);

offering for acceptance by the second party any counter-offered composite resources (fifth routine of the third program) and, if the offer is not accepted, iterating the above reservation request steps until a suitability match is successfully made (sixth routine) or the program (seventh routine) or the second user (eighth routine) determines that no suitable composite resource exists for reservation (ninth routine);

modifying through a tenth routine of the second program, in response to an acceptable match, at least one of the availability status of the composite resource and a measure of the capacity of the composite resource;

storing through an eleventh routine of the second program any modification to the availability status or measure in the one or more data stores;

storing through a twelfth routine of the second program information relating to the reservation, including information relating to the first and second parties, in the one or more data stores;

transmitting through a thirteenth routine of the second program one or more links to the information stored in the one or more data stores through a computer-based communication from the computer device into a program contained on the first (first program) and second (third program) party's devices receiving the transmitted links into the first and third programs containing program routines (second and ninth, respectively) programmed to communicate the links;

communicating the transmission through the second program routine of the first program and ninth program routine of the third program to the first (first program) and second (third program) parties, wherein the function of the first communication is to: 1) increase demand through more favorable transaction parameter values to potential users of the composite resources; 2) decrease demand through less favorable transaction parameter values to potential users of the composite resources; 3) increase capacity through more favorable transaction parameter values to service provider resources; 4) reduce capacity through less favorable transaction parameter values to service provider resources; 5) increase capacity through changing the composition of resources within the composite resource; 6) reduce capacity through changing the composition of resources within the composite resource; 7) obtain employment or independent contractor opportunities; or, 8) implement two or more of the above functions at the same time;

wherein the at least one composite resource is employed in prepared food service industries; and, wherein the at least one service date and service time is a date and time point or range measure indicating a present or future first date and time when the service is available.

* * * * *